US006668079B2

(12) United States Patent
Takemoto

(10) Patent No.: US 6,668,079 B2
(45) Date of Patent: *Dec. 23, 2003

(54) METHOD OF PROCESSING IMAGE SIGNAL

(75) Inventor: Fumito Takemoto, Minamiashigara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 83 days.

This patent is subject to a terminal disclaimer.

(21) Appl. No.: 09/852,633

(22) Filed: May 11, 2001

(65) Prior Publication Data

US 2003/0053085 A1 Mar. 20, 2003

Related U.S. Application Data

(62) Division of application No. 08/980,367, filed on Nov. 28, 1997, now Pat. No. 6,278,533.

(30) Foreign Application Priority Data

Nov. 29, 1996 (JP) .............................................. 8-319736
Nov. 29, 1996 (JP) .............................................. 8-319749
Nov. 29, 1996 (JP) .............................................. 8-319754
Nov. 29, 1996 (JP) .............................................. 8-319769
Dec. 20, 1996 (JP) .............................................. 8-342050

(51) Int. Cl.[7] .............................. G06K 9/00; G03F 3/08
(52) U.S. Cl. ...................... 382/167; 358/521; 358/522
(58) Field of Search ................................ 382/162, 167; 358/500, 501, 518, 521, 523, 527, 515, 522

(56) References Cited

U.S. PATENT DOCUMENTS

| 3,612,753 | A | 10/1971 | Korman ...................... 358/534 |
| 4,561,016 | A | 12/1985 | Jung et al. ................... 358/527 |
| 4,642,680 | A | 2/1987 | Yamada ....................... 358/530 |
| 4,812,879 | A | 3/1989 | Suzuki ......................... 358/527 |
| 4,893,180 | A | 1/1990 | Shigaki et al. .............. 358/521 |
| 5,187,570 | A | 2/1993 | Hibi et al. ................... 358/515 |
| 5,200,817 | A | 4/1993 | Birnbaum .................... 358/505 |
| 5,268,754 | A | 12/1993 | Van De Capelle et al. .. 382/162 |
| 5,278,669 | A | 1/1994 | Takemoto .................... 358/518 |
| 5,315,347 | A | 5/1994 | Shimizu et al. .............. 355/43 |
| 5,317,678 | A | 5/1994 | Okawara et al. ............ 345/426 |
| 5,343,312 | A | 8/1994 | Hibi et al. ................... 358/520 |
| 5,375,193 | A | 12/1994 | Adams, Jr. ................... 348/33 |
| 5,416,890 | A | 5/1995 | Beretta ........................ 345/431 |
| 5,428,720 | A | 6/1995 | Adams, Jr. .................. 358/518 |
| 5,471,324 | A | 11/1995 | Rolleston ..................... 358/523 |
| 5,479,524 | A | 12/1995 | Farrell et al. ................ 382/162 |
| 5,537,228 | A | 7/1996 | Dillinger ..................... 358/534 |
| 5,668,596 | A | 9/1997 | Vogel .......................... 348/222 |
| 5,668,890 | A | 9/1997 | Winkelman ................. 382/167 |
| 5,734,801 | A | 3/1998 | Noguchi et al. ............. 358/518 |
| 5,768,130 | A | 6/1998 | Lai ............................. 364/489 |
| 5,844,699 | A | 12/1998 | Usami et al. ................ 358/518 |
| 6,278,533 | B1 * | 8/2001 | Takemoto .................... 358/521 |

FOREIGN PATENT DOCUMENTS

| JP | 2-105676 | 4/1990 | ............ H04N/1/40 |
| JP | 2-291777 | 12/1990 | ............ H04N/1/46 |
| JP | 2-291778 | 12/1990 | ............ H04N/1/46 |
| JP | 4-337965 | 11/1992 | ............ H04N/1/40 |
| JP | 4-337966 | 11/1992 | ............ H04N/1/40 |
| JP | 10-816 | 1/1998 | ............ B41J/2/525 |

OTHER PUBLICATIONS

Kanamori et al., "Color Correction of Color Hardcopy by Interpolation using 4–Neighborhood Points," *The Journal of the Institute of Image Election*, vol. 18, No. 5 (1989) pp. 319–328.

* cited by examiner

*Primary Examiner*—Mehrdad Dastouri
(74) *Attorney, Agent, or Firm*—Sughrue Mion, PLLC

(57) ABSTRACT

R, G, B signals outputted from a digital camera or a color scanner are converted into calorimetric signals by a colorimetric converter having a colorimetric conversion matrix and a calorimetric conversion table. Colorimetric signals are processed for setup by a calorimetric setup unit. Colorimetric signals processed for setup are converted by a cmyk converter into c, m, y, k signals that are half tone dot % signals for being supplied to an image output unit such as a film producing device, a color printer, or the like.

5 Claims, 10 Drawing Sheets

F I G. 4
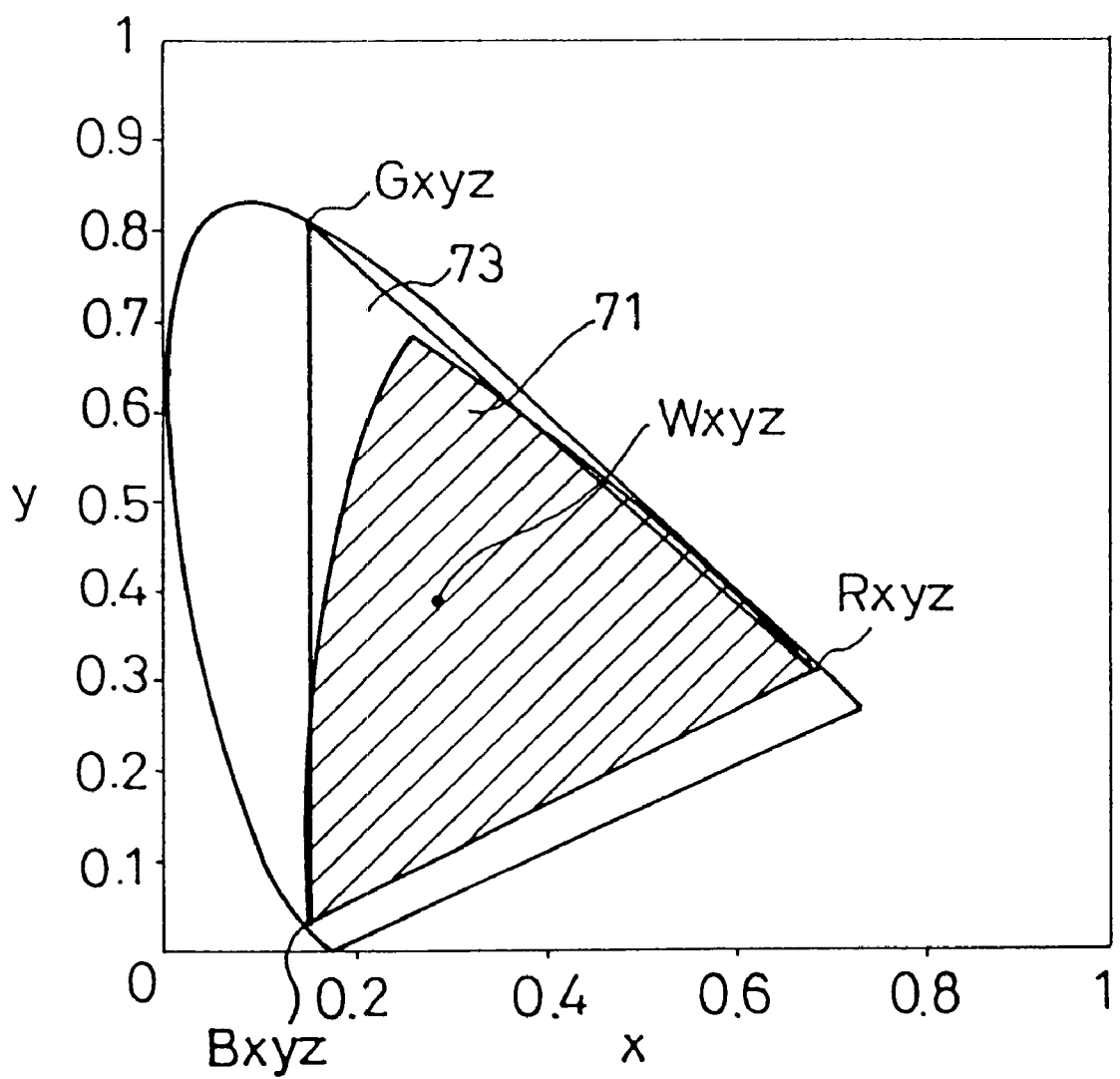

METHOD OF PROCESSING IMAGE SIGNAL

This is a divisional of application Ser. No. 08/980,367 filed Nov. 28, 1997, now U.S. Pat. No. 6,278,533 issued Aug. 21, 2001 the disclosure of which is incorporated herein by reference.

BACKGROUND OF THE INVENTION

1. Field of the Invention

The present invention relates to a method of processing an image signal, and more particularly to a method of converting an image signal such as R (red), G (green), B (blue) signals generated by an imaging device such as a color digital camera (also referred to as a digital camera) and representing an original scene which is captured by the imaging device, or an imaging signal such as R, G, B signals generated by an image reading device such as a color scanner (also referred to as a scanner), into a colorimetric signal, processing a colorimetric signal for setup, converting a calorimetric signal processed for setup into a dye density signal for use on a reversal medium, or converting a colorimetric signal processed for setup into c, m, y, k (cyan, magenta, yellow, and black) signals for being supplied to an image output device such as a film producing device, a plate producing device, a color printer, or the like.

2. Description of the Related Art

Device-dependent image signals such as R, G, B signals generated by color digital cameras are converted into device-independent image signals such as tristimulus signals X, Y, Z according to color conversion processes disclosed in Japanese laid-open patent publications Nos. 2-291777 and 2-291778, for example.

Techniques for predicting reproducible colors on prints, for example, device-independent tristimulus signals X, Y, Z from device-dependent c, m, y halftone dot % signals or reproducible colors based on color signals c, m, y, k are disclosed in Japanese laid-open patent publications Nos. 4-337965 and 4-337966, for example.

According to a process of accurately converting colors as disclosed in the Journal of the Institute of Image Electron, Vol. 18, No. 5 (1989), a three-dimensional (XYZ) color space is divided into 512 cubic regions, and color correcting values at a total of 729 grid points are calculated in a process optimized for the characteristics of an output device and stored as the data of a look up table (LUT). Input values between the grid points are determined by a interpolating process which three-dimensionally interpolates the LUT.

According to another known process, R, G, B signals produced from a color reversal subject (prepared by exposing a color reversal film to light from an image, developing the image on the color reversal film) which carries a positive image are converted into equivalent neutral density (END) signals by a color scanner which is a linear scanning reader, and the END signals are converted into halftone dot % signals with reference to setup points (highlight and shadow points) determined by a setup process. The halftone dot % signals are then converted into c, m, y, k signals, which are then binarized (i.e., converted into halftone dots), finally producing a printing plate or a printed material.

With conventional color scanners, R, G, B signals are processed for setup based on color-separating default conditions (image processing conditions including at least a gradation conversion process, a color correction process, an under color removal process, and a K-plate generating process) which are carried on the respective color scanners and empirically optimized, and R, G, B signals produced from a color reversal subject are converted into c, m, y, k signals.

With respect to R, G, B signals produced by a digital camera, color-separating default conditions may be established using an image processing tool (software) such as Adobe Photoshop (registered trademark).

SUMMARY OF THE INVENTION

It is a major object of the present invention to provide a method of processing an image signal, which can easily convert device-dependent image signals into device-independent image signals.

Another object of the present invention is to provide a method of processing an image signal, which allows a setup process based on END signals, for which gray conditions are prescribed in a device-dependent signal system, to be applied to a device-independent signal system.

Still another object of the present invention is to provide a method of processing an image signal for producing c, m, y, k signals capable of reproducing colors of an original scene with ease and accuracy.

Yet still another object of the present invention is to provide a method of processing an image signal, which is capable of converting image signals of an original scene captured by a digital camera into color signals that can utilize empirically optimized standard default separating conditions of an existing scanner.

A further object of the present invention is to provide a method of processing an image signal, which will convert R, G, B image signals generated by a digital camera or R, G, B image signals read by a scanner into c, m, y, k signals using empirically optimized default separating conditions of a particular existing scanner.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a CIE chromaticity diagram illustrative of a color reproduction range for reversal films;

DETAILED DESCRIPTION OF THE PREFERRED EMBODIMENTS

Figure 1:
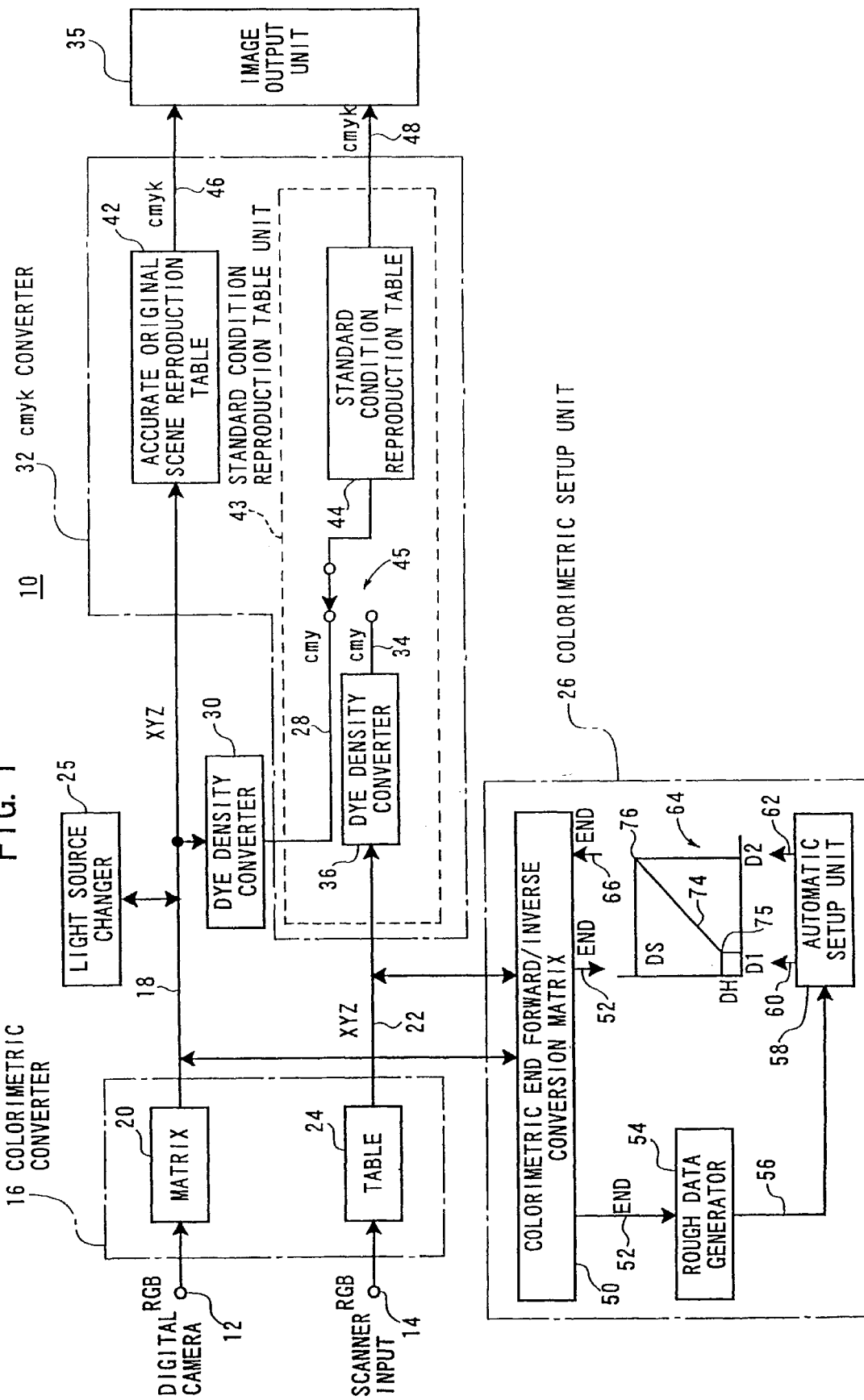
FIG. 1 is a block diagram of an image signal processing apparatus which can carry out a method of processing an image signal according to the present invention.

FIG. 1 shows an overall arrangement of an image signal processing apparatus 10 which can carry out a method of processing an image signal according to the present invention.

As shown in FIG. 1, the image signal processing apparatus 10 has a calorimetric converter 16 which will be supplied with R, G, B signals (digital image signals) 12 representing image-information of a scene that has been captured by a digital camera (not shown) as an imaging device, and also with R, G, B signals (digital image signals) 14 representing image information of a reversal subject that has been read by an image input unit (which may be referred to as a linear scanning reader or a scanner input unit) of a scanner (not shown) as an image reading device. The digital camera may be a digital video camera or any device capable of capturing image signals and outputting digital image signals (digital image data).

The scanner may be a linear scanning reader which is a color scanner incorporating a linear image sensor or an area scanning reader which is a color scanner incorporating an area image sensor.

The calorimetric converter 16 has a colorimetric conversion matrix (hereinafter simply referred to as a matrix) 20 for converting R, G, B signals 12 from a digital camera into X, Y, Z or L*, a*, b* colorimetric signals (hereinafter referred to as X, Y, Z signals) 18, and a colorimetric conversion table (hereinafter referred to as a colorimetric conversion lookup table, a lookup table, or a table) 24 for converting R, G, B signals from the scanner input unit into X, Y, Z signals or L*, a*, b* colorimetric signals 22.

Usually, the R, G, B signals 12, 14 are called device-dependent signals (data), and the calorimetric signals 18, 22 are called device-independent signals (data).

The colorimetric signals 18 originating from the digital camera is supplied, if necessary, to a light source changer 25 which absorbs the difference between an imaging light source and an observing light source, a colorimetric setup unit (hereinafter also referred to as a setup unit) 26 for setting up a highlight area density and a shadow area density, a dye density converter 30 for converting the colorimetric signals 18 of the original scene (captured scene) into dye density signals 28 on the reversal subject, and an accurate original scene reproduction table 42 of a cmyk converter 32.

The calorimetric signals 22 originating from the scanner input unit are supplied to the colorimetric setup unit 26 and a dye density converter 36 of a standard condition reproduction table unit 43, for converting the calorimetric signals 22 into dye density signals 34.

The dye density signals (c, m, y signals) 28, 34 outputted from the dye density converters 30, 36 are selected by a switch (multiplexer or selector) 45 and supplied to a standard condition reproduction table 44.

The cmyk converter 32 basically has the accurate original scene reproduction table 42 and the standard condition reproduction table unit 43.

The accurate original scene reproduction table 42 comprises a lookup table for converting the calorimetric signals 18 supplied from the digital camera into c, m, y, k signals 46 which are halftone dot % signals that are calorimetrically saved.

The standard condition reproduction table unit 43 has the dye density converter 36 for converting the colorimetric signals 22 into dye density signals 34, the switch 45 for selecting either the dye density signals 28 from the dye density converter 30 or the dye density signals 34 signals from the dye density converter 36, and the standard condition reproduction table 44. The standard condition reproduction table 44 serves to convert either the dye density signals 28 or the dye density signals 34 into c, m, y, k signals 48 which are halftone dot % signals. The cmyk converter 32 has a three-color/four-color conversion function for converting signals in a trichromatic system into signals in a tetrachromatic system.

The c, m, y, k signals 46, 48 which are halftone dot % signals outputted from the cmyk converter 32 are supplied to an image output unit 35 which outputs an image based on the c, m, y, k signals 46, 48.

The image output unit 35 may be of a known nature which comprises a binary converter (not shown), a laser beam exposure scanner (image setter or the like), an image developing unit, a printing plate generator, and a printing unit. The binary converter compares the c, m, y, k signals 46, 48 with C, M, Y, K threshold matrixes selected depending on output conditions representative of a screen ruling, a screen angle, and so on for thereby converting the c, m, y, k signals 46, 48 into binary signals. The laser beam exposure scanner applies a laser beam that is selectively turned on and off by the binary signals (also called binary image signals) to films to form latent images on the films. The image developing unit develops the latent images on the films, producing platemaking films. The printing plate generator then generates printing plates from the platemaking films. In the printing unit, the printing plates, i.e., four C, M, Y, K printing plates, are mounted on a printing press, and inks of four colors applied to the printing plates are transferred to a sheet of print paper, which is produced as a printed hard copy carrying a color image.

The image output unit 35 may comprise a direct digital color proofing (DDCP) system capable of printing halftone dots according to a given screen ruling and angle directly as a halftone dot image on a sheet of print paper, without developing an image on a film, for simulating the image.

The colorimetric setup unit 26 comprises a colorimetric END forward/inverse conversion matrix (hereinafter also referred to as a matrix) 50 for converting the calorimetric signals 18, 22 into colorimetric END signals 52, a rough data generator 54 for generating calorimetric END signals 56 from the colorimetric END signals 52 through a decimation process and outputting the colorimetric END signals 56, an automatic setup unit 58 for automatically determining a highlight density signal 60 and a shadow density signal 62 based on the generated colorimetric END signals 56, and an END/END converter 64 for gradation-converting the calorimetric END signals 52 into colorimetric END signals 66. The calorimetric END forward/inverse conversion matrix 50 also serves to convert the colorimetric END signals 66 back into the calorimetric signals 22.

The image signal processing apparatus 10 is controlled by a computer (not shown) which includes a CPU, a ROM, a RAM, an external storage unit, a display monitor, an input/output device, and so on. The blocks of the image signal processing apparatus 10 which are described above are both hardware-implemented and software-implemented. The computer which controls the image signal processing apparatus 10 functions as control, decision, calculation, and comparison means.

Detailed arrangements and operation of the blocks of the image signal processing apparatus 10 will be described below.

Figure 2:
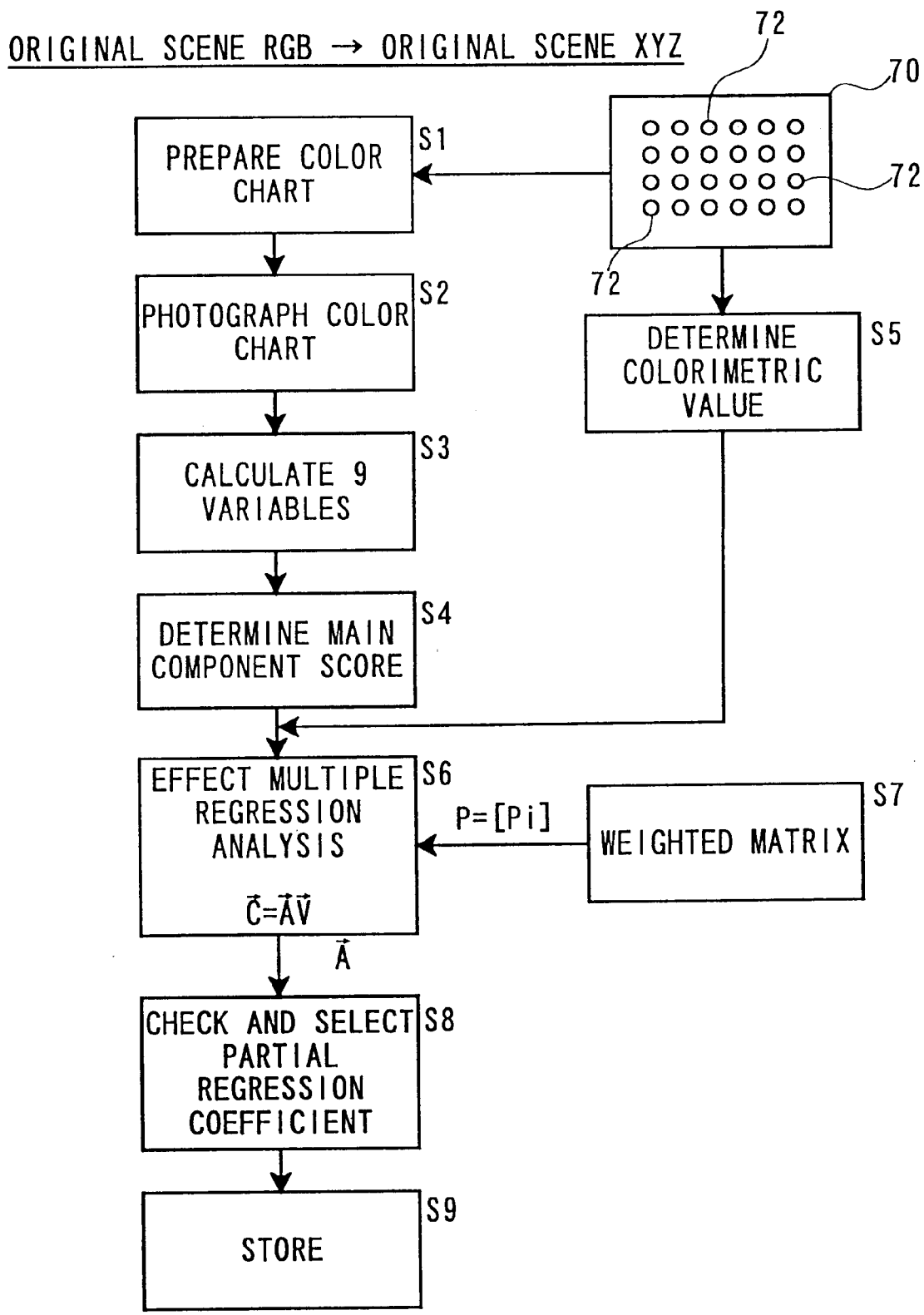
FIG. 2 is a flowchart of a sequence for generating a colorimetric conversion matrix.

The matrix 20 of the colorimetric converter 16 for converting R, G, B signals 12 into X, Y, Z signals 18 is generated according to a sequence shown in FIG. 2. The matrix 20 will be described below as converting signals from an RGB color space into signals in a CIE-L*a*b* (light source: auxiliary standard light CIE-D50) color space. Signal conversion between the CIE-L*a*b* color space and the XYZ color space can uniquely be carried out according to known equations (1) given below. Therefore, processing in the XYZ color space (or the CIE-L*a*b* color space) can be replaced with processing in the CIE-L*a*b* color space (or the XYZ color space), or with processing in an equivalent calorimetric color space.

$$L^* = 116(Y/Yn)^{1/3} - 16$$
$$a^* = 500\{(X/Xn)^{1/3} - (Y/Yn)^{1/3}\}$$
$$b^* = 200\{(Y/Yn)^{1/3} - (Z/Zn)^{1/3}\}$$

(1)

First, a color chart 70 having a plurality of color patches 72 (see FIG. 2) representing typical colors with different chromas, lightnesses, and hues is generated in a step S1. In this embodiment, a Macbeth color checker (registered trademark: manufactured by Macbeth, a division of Kollmorgen, USA) is used as the color chart. As well known in the art, the Macbeth color checker has 24 colored squares with CIE (1931) xyY values, hues, Munsell color values, and chromas. The 24 colors are:
1. Dark skin
2. Light skin
3. Blue sky
4. Foliage
5. Blue flower
6. Bluish green
7. Orange
8. Purplish green
9. Moderate red
10. Purple
11. Yellow green
12. Orange yellow
13. Blue
14. Green
15. Red
16. Yellow
17. Magenta
18. Cyan
19. White
20. Neutral 8 (light gray, "8" represents Munsell color value 8)
21. Neutral 6.5 (light medium gray)
22. Neutral 5 (medium gray)
23. Neutral 3.5 (dark gray)
24. Black The color chart is not limited to the Macbeth color checker, but may be a color chart which uniformly covers a color space, such as JIS standard color chips or the like.

Then, under the imaging light source CIE-D50, the 24 colors of the color chart, i.e., the 24 patches 72, are imaged by a digital camera thereby to produce R, G, B signals 12 of each of the patches 72, and the R, G, B signals 12 are converted into luminance values, which are then raised to the one-third power in a step S2. The R, G, B signals 12 may be converted into luminance values by canceling the γ correction that has been performed in the device. The luminance values are raised to the one-third power in order to process the produced R, G, B signals 12 in the CIE-L*a*b* colorimetric system, as can be seen from the above equations (1).

Values R, G, B, $R^2$, $G^2$, $B^2$, RG, GB, BR (nine variables) up to terms of second order are calculated from the R, G, B signals 12 produced with respect to each of the patches 72 in the step S2, specifically, the R, G, B values that have been converged into luminance values and raised to the one-third power, in a step S3.

Then, the 24-color data of the nine variables produced in the step S3 are subjected to a principal component analysis to produce principal component scores V of the nine variables, in order to avoid a multicollineation phenomenon in a multiple regression analysis, in a step S4. For each of the colors, the principal component score V (V is considered to be a vector) expressed by the following equation (2):

$$V = (v_1, v_2, v_3, v_4, v_5, v_6, v_7, v_8, v_9)$$

(2)

In the equation (2), the components ($v_1$, $v_2$, $v_3$, $v_4$, $v_5$, $v_6$, $v_7$, $v_8$, $v_9$) of the principal component score V are not correlated to each other whatsoever, and do not cause the multicollineation phenomenon.

Thereafter, the patches 72 of the color chart 70, i.e., the 24 colors, are measured by a colorimetric meter (not shown) to produce their colorimetric values C (L*a*b*) (C is also considered to be a vector as it is produced for the 24 colors) in a step S5. The colorimetric values C may be measured at any point of time in the steps S2–S4.

Then, using the colorimetric values C as criterion variables (dependent variables) and the principal component scores V as explanatory variables (independent variables), partial regression coefficients A (A is also considered to be a vector) are determined according to a multiple regression analysis in a step S6.

The multiple regression analysis is subjected to a weighted matrix (hereinafter referred to as a matrix) P=[Pi] (i=1, 2, . . . 24) that is held in 1:1 correspondence to the 24 colors of the colorimetric values C, which constitute a group of criterion variables, in a step S7. Pi represents the weight of each color. Of the above 24 colors, the weights of the grays indicated by 20. Neutral 8 (light gray, "8" represents Munsell color value 8), 21. Neutral 6.5 (light medium gray), 22. Neutral 5 (medium gray), and 23. Neutral 3.5 (dark gray) are increased to improve color reproducibility of the grays. The weights of not only the grays, but other limited desired colors, e.g., the color of skin for human beings or the color of sky for outdoor backgrounds, may be increased to reproduce those colors of skin and sky with higher accuracy. The colors may automatically be weighted by statistically processing the inputted R, G, B signals 12, i.e., dividing the color space of a one-frame image signal, i.e., pixel-divided image data, into regions around the colors of the patches of the chart, and weighting the colors depending on the frequencies of the pixels present in the regions, e.g., increasing the weight of the color whose pixel frequency is highest and progressively reducing the weights of the colors whose pixel frequencies are progressively lower. The color space to be divided may be an RGB color space or an XYZ (L*a*b*) color space which has been converted with an unweighted matrix.

Those colors with increased weights are called principal colors of an image. In order that the sum of the values of elements of the matrix P is equal to "1", the values of the elements are standardized by being divided by the sum of the values of the elements.

The multiple regression analysis for determining partial regression coefficients A in the step S6 will be described in greater detail below.

It is assumed that a linear equation (3) given below is satisfied between the colorimetric values (vector) C which are criterion variables, the multiple regression coefficients (vector) A to be determined, and the principal component scores (vector) V with respect to each of the calorimetric values C of the 24 colors.

$$C=AV \quad (3)$$

The equation (3) is equivalent to an equation (4) expressed by a matrix and equations (5) expressed by a sum symbol Σ as follows:

$$\begin{pmatrix} L^* \\ a^* \\ b^* \end{pmatrix} = \begin{pmatrix} a_{11} & a_{12} & \cdots & a_{110} \\ a_{21} & a_{22} & \cdots & a_{210} \\ a_{31} & a_{32} & \cdots & a_{310} \end{pmatrix} \begin{pmatrix} V_1 \\ V_2 \\ \vdots \\ V_{10} \end{pmatrix} \quad (4)$$

where $V_{10} = 1$ $$L^* = \sum_{j=1}^{10} a_{1j} V_j \quad (5)$$

$$a^* = \sum_{j=1}^{10} a_{2j} V_j$$

$$b^* = \sum_{j=1}^{10} a_{3j} V_j$$

where $V_{10} = 1$

Equations which use the sum symbol Σ, like the equations (5), will be expressed as $L^* = \Sigma$ (j=1→10)$a_{ij}V_j$, for example.

The partial regression coefficients A are determined using a method of least squares with respect to each of L*a*b*. With respect to L*, for example, partial regression coefficients $a_{ij}$ which minimize $e_L$ according to the following equation (6) may be determined:

$$e_L = \Sigma \ (i=1 \rightarrow 24) Pi \{Ci - \Sigma \ (j=1 \rightarrow 10) a_{1j} V_j\}^2 \quad (6)$$

where i is the patch number of the color chart 70, Pi is the weight of each color, and j is the number (1, 2, . . . , 10) of the variable.

The equation (6) is expressed by a vector and a matrix according to an equation (7) given below. In the equation (7), the calorimetric values C and the partial regression coefficients a are a vector, and the principal component scores [V] and the weighted matrix [P] are a matrix, and t represents the transpose of a matrix.

$$e_L = (\text{vector } C - \text{vector } a[V])^t[P](\text{vector } C - \text{vector } a[V]) \quad (7)$$

Hereinafter, the vector C is indicated simply as C and the vector a as a. The equation (7) can be modified as follows:

$$e_L = (C^t - [V]^t a^t)^t [P](C^t - [V]^t a)$$

By switching a and [V] around, the above equation becomes:

$$e_L = (C - a[V])[P](C^t - [V]^t a)$$

Since, generally, $(ABC)^t = C^t B^t A^t$, $$e_L = C[P]C^t + a[V][P][V]^t a^t - a[V][P]C^t - C[P][V]^t a^t$$

By putting $[V][P][V]^t = [N]$, $[V][P]C^t = [U]$, the above equation becomes:

$$e_L = C[P]C^t + a[N]a^t - 2a[U] \quad (8)$$

To minimize $e_L$ according to the equation (8), the differential of each element of the partial multiple coefficients a must be equal to "0". Therefore, the following equation is satisfied:

$$\frac{1}{2} \cdot \frac{\partial e_L}{\partial a} = \frac{1}{2} \frac{\partial (a[N]a^t)}{\partial a} - \frac{\partial (a[U])}{\partial a} = 0 \quad (9)$$

From the equation (9), the partial multiple coefficients a can be determined according to the following equation (10):

$$(1/2)\{[N]a^t + (a[N])^t\} - [U] = 0 \quad (10)$$

$$[N]a^t = [U]$$

$$a^t = [N]^{-1}[U]$$

$$a = [U]^t([N]^t)^{-1}$$

$$= ([V][P]C^t)^t([V][P][U]^t)^{-1}$$

$$= C[P][U]^t([V][P][U]^t)^{-1}$$

where $[\ ]^{-1}$ represents an inverse matrix.

In this manner, 10 partial regression coefficients a ($a_{1j}$) with respect to L* are determined. Similarly, 10 partial regression coefficients $a_{2j}$ with respect to a* and 10 partial regression coefficients $a_{3j}$ with respect to b* are determined according to the same process. The total number of the determined partial regression coefficients $a_{1j}, a_{2j}, a_{3j}$ is 3×10 {see the equation (4)}.

The partial regression coefficients A with respect to the criterion variables L*a*b* are collectively expressed as follows:

$$A = CPV^t(VPV^t)^{-1} \quad (11)$$

The partial regression coefficients A determined with respect to the criterion variables L*a*b* are then tested with a significance level of 5% in a step S8, and explanatory variables V at the significance level of 5% (confidence level of 95%) are stored in the RAM, and the partial regression coefficients A are stored as the matrix 20 shown in FIG. 1 in a step S9. The partial regression coefficients A may be tested with a significance level of 1% in the step S8.

In the step S8, as shown in equations (12)–(16) given below, a regression sum $S_R$ of squares {a sum of squares of differences between the estimated values L*i (with the symbol "^" over "L") and the average L*i of the colorimetric values (with the symbol "–" over "L"): see the equation (12)} and a residual sum $S_E$ of squares {a sum of squares of differences between the colorimetric values L*i and the estimated values L*i: see the equation (13)} are determined, and unbiased variances $V_R$, $V_E$ {see the equations (14), (15)} of the regression sum $S_R$ of squares and the residual sum $S_E$ of squares are determined. Furthermore, partial F values Fj {see the equation (16)} are determined. In the equation (16), "a" with "^" placed thereover represents estimated values of coefficients of the left matrix on the right-hand side of the equation (4), and $S^{jj}$ represents diagonal terms of inverse matrixes of variance or covariance matrixes of explanatory variables $v_j$.

$$S_R = \sum_{i=1}^{24} (\hat{L}*i - \overline{L}*i)^2 \quad (12)$$

-continued $$S_E = \sum_{i=1}^{24} (L*i - \hat{L}*i)^2 \quad (13)$$

$$V_R = \frac{S_R}{10} \quad (14)$$

$$V_E = \frac{S_E}{24-9-1} \quad (15)$$

$$F_j = \frac{\hat{a}_j^2}{S^{jj}V_E/(24-1)} \quad (16)$$

If the partial F values Fj are greater than a value=$F'_{n-p-1}(0.05)=F'_{24-9-1}(0.05)=F'_{14}(0.05)=4.60011$ which has been determined by referring to an F distribution with a signification level of 5%, then the regression is significant with the signification level of 5%, and the partial regression coefficients are judged as useful for prediction and stored in the matrix 20 (see FIG. 1).

In this manner, it is possible to generate the matrix 20 for determining the criterion variables L*a*b* which will convert the R, G, B signals (see FIG. 1) produced by the digital camera into the X, Y, Z colorimetric signals 18. Equations relative to the matrix are given below:

$L^* = \Sigma a_{1j}v_j$ (j: a variable at a significance level of 5%)

$a^* = \Sigma a_{2j}v_j$ (j: a variable at a significance level of 5%)

$b^* = \Sigma a_{3j}v_j$ (j: a variable at a significance level of 5%) (17)

In the equations (17), the remark (j: a variable with a significance level of 5%) means that only a variable obtained by the test with the significance level of 5% is used, unlike the equation (5). In the equations (17), $a_{1j}$, $a_{2j}$, $a_{3j}$ represent elements of the partial regression coefficient matrix A, and $v_j$ represent the principal component scores V as the explanatory variables determined in the step S4.

Using the matrix 20, it is possible to effect calorimetric conversion with the existing color chart 70. Since no lookup table is employed, any memory capacity used may be small, i.e., calorimetric conversion can be effected with accuracy even though the memory capacity used is small. Use of the weighted matrix P makes it possible to effect color conversion with accuracy, limited to desired colors (principal colors) of the image. If the number of explanatory variables is 9, then the testing process in the step S8 may be dispensed with, and a matrix corresponding to the equations (17) may be generated using all the partial regression coefficients A.

The values thus obtained in the CIE-L*a*b* color space are converted into values in the XYZ color space according to the equations (1), which are used as the colorimetric signals 18 outputted from the matrix 20 (see FIG. 1).

The calorimetric signals 18 are then calorimetrically changed by the light source changer 25 into new calorimetric signals 18. If the observing light source is the same as the imaging light source (CIE-D50) used when the image is captured by the digital camera, then calorimetric signals 18 do not need to be colorimetrically changed by the light source changer 25.

Colorimetric values X, Y, Z can be converted into new calorimetric values X', Y', Z' by the light source changer 25 according to the following equations (18), (19), (20):

$$X' = XX_2/X_1 \quad (18)$$

$$Y' = YY_2/Y_1 \quad (19)$$

$$Z' = ZZ_2/Z_1 \quad (20)$$

where X, Y, Z represent calorimetric values under the imaging light source, X', Y', Z' calorimetric values under the observing light source, $X_1$, $Y_1$, $Z_1$ white dots of the imaging light source, and $X_2$, $Y_2$, $Z_2$ white dots of the observing light source.

It is hereinafter assumed that the calorimetric signals 18 have been converted by the light source changer 25.

The R, G, B signals from the scanner input unit are converted into calorimetric signals 22 which are X, Y, Z signals by the colorimetric conversion table 24.

The colorimetric conversion table 24 is prepared as follows: First, a color reversal subject having, for example, a combination of 13 equally spaced densities of c, m, y color patches, i.e., a total of 13×13×13=2197 color patches, is prepared. Then, the color patches of the reversal subject are read by a scanner input unit and also read by a colorimetric meter. The R, G, B values read by the scanner input unit and the X, Y, Z values read by the calorimetric meter are associated with each other into a table, which will be used as the colorimetric conversion table 24. Values between the read values, which are not present in the calorimetric conversion table 24, are determined by an interpolation process.

Since the R, G, B signals 14 supplied from the scanner input unit are converted into the colorimetric signals 22 by the colorimetric conversion table 24 and the R, G, B signals 12 supplied from the digital camera are converted into the calorimetric signals 18 by the colorimetric conversion matrix 20, they can be processed by an automatic setup process using the calorimetric setup unit 26 in common. Specifically, automatic setup process software can be used in common on the colorimetric signals 18, 22 because the colorimetric signals 18, 22 are converted into a colorimetric END signal.

Figure 3:
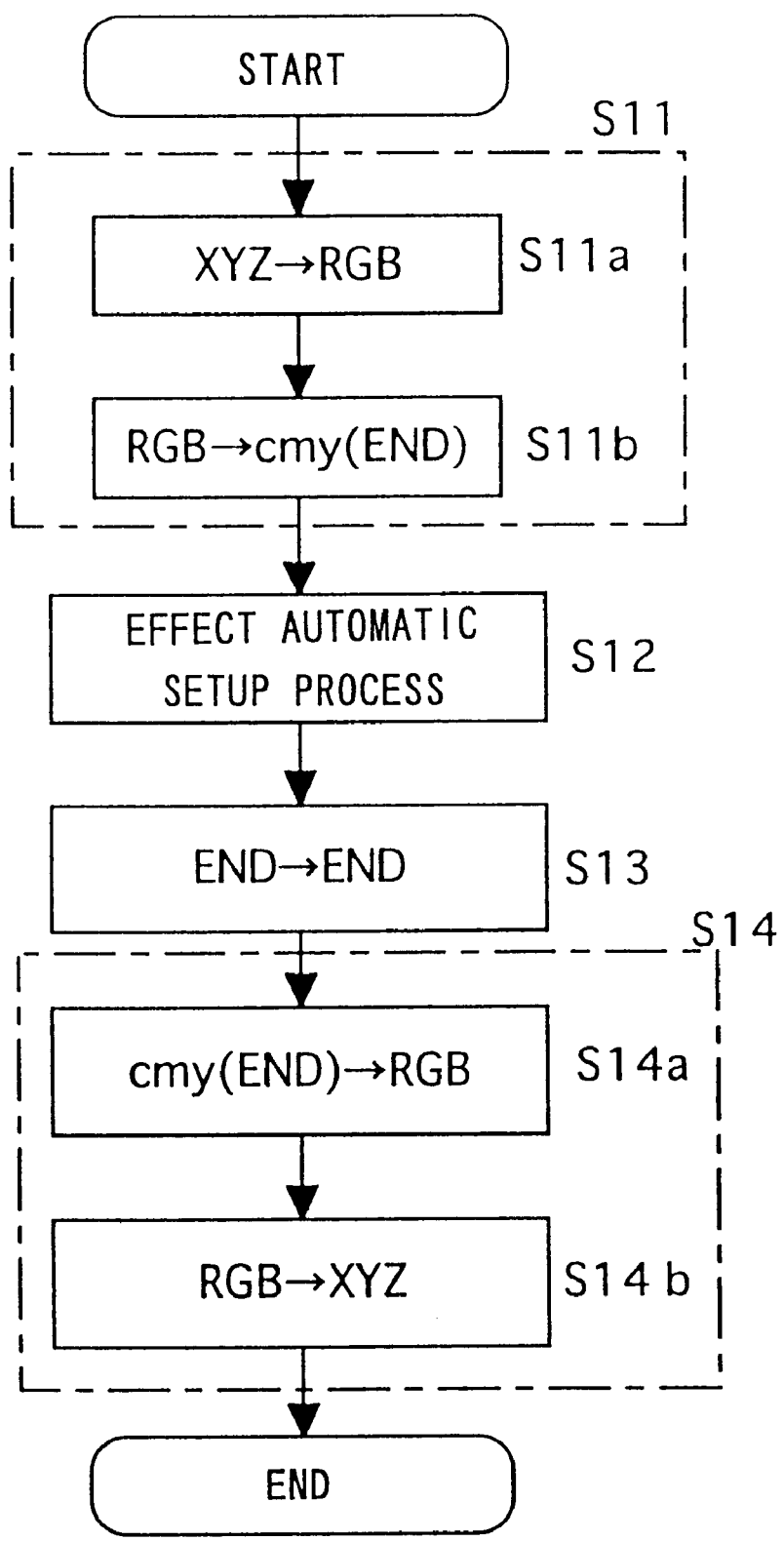
FIG. 3 is a flowchart of an operation sequence of a colorimetric setup unit.

The calorimetric setup unit 26 and its operation sequence will be described below with reference to FIGS. 1, 3, and 4.

Heretofore, gradation conversion has been carried out in a density space as its intuitive understanding can easily be attained in the density space. Image processing such as gradation conversion and color correction on commercially available color scanners is also effected with respect to density signals.

First, the colorimetric END forward/inverse conversion matrix 50 converts the colorimetric signals 18 or the colorimetric signals 22 into c, m, y END (equivalent neutral density) signals 52, which are colorimetric density signals, in a step S11. Specifically, the conversion process in the step S11 comprises a linear conversion process for converting calorimetric signals in an XYZ colorimetric system into calorimetric signals in an RGB colorimetric system in a step S11*a*, and a nonlinear conversion process for converting colorimetric signals in the RGB colorimetric system into colorimetric signals in a cmy colorimetric system in a step S11*b*. The END signals converted from the calorimetric signals 18 or the calorimetric signals 22 are referred to as calorimetric END signals 52.

For converting the calorimetric signals 22 of the reversal subject into the colorimetric END signals 52, for example, a color reproduction range 71 (shown hatched in FIG. 4) of a reversal film is drawn on a CIE chromaticity diagram shown in FIG. 4. It is assumed that coordinates on the chromaticity diagram, i.e., chromaticity coordinates, of three reference color stimuli Rxyz, Gxyz, Bxyz of a range 73 which contains the color reproduction range 71 are represented by equations (21)–(23) given below. The range 73 represents a triangular area whose vertexes are indicated respectively by the reference color stimuli Rxyz, Gxyz, Bxyz on the chromaticity diagram shown in FIG. 4.

$$Rxyz = Rxyz(x_R, y_R, z_R) \quad (21)$$

$$Gxyz = Gxyz(x_G, y_G, z_G) \quad (22)$$

$$Bxyz = Bxyz(x_B, y_B, z_B) \quad (23)$$

Coordinates of a basic stimulus (white stimulus) Wxyz in the XYZ calorimetric system on the chromaticity diagram shown in FIG. 4 are expressed as follows:

$$Wxyz = Wxyz(x_W, y_W, z_W) \quad (24)$$

The equation (25) given below can convert the colorimetric signals 22 in the XYZ colorimetric system (the right matrix on the right-hand side of the equation (25)) through a conversion matrix (the left matrix on the right-hand side of the equation (25)) into color signals R, G, B in the RGB colorimetric system (the matrix on the left-hand side of the equation (25)).

$$\begin{pmatrix} R \\ G \\ B \end{pmatrix} = \begin{pmatrix} R_X & R_Y & R_Z \\ G_X & G_Y & G_Z \\ B_X & B_Y & B_Z \end{pmatrix} \begin{pmatrix} X \\ Y \\ Z \end{pmatrix} \quad (25)$$

where $$R_X = A_{11}/\Delta_1,\ R_Y = A_{12}/\Delta_1,\ R_Z = A_{13}/\Delta_1$$

$$G_X = A_{21}/\Delta_2,\ G_Y = A_{22}/\Delta_2,\ G_Z = A_{23}/\Delta_2$$

$$B_X = A_{31}/\Delta_3,\ B_Y = A_{32}/\Delta_3,\ B_Z = A_{33}/\Delta_3$$

$$\Delta_i = A_{i1} x_W + A_{i2} y_W + A_{i3} z_W$$

$A_{ij}$ represents a cofactor of the following matrix equation D:

$$D = \begin{vmatrix} x_R & y_R & z_R \\ x_G & y_G & z_G \\ x_B & y_B & z_B \end{vmatrix}$$

The cofactor $A_{ij}$ is determined according to the following equation:

$$A_{ij} = (-1)^{i+j} D_{ij}$$

where $D_{ij}$ represents a submatrix from which an ith row and a jth column have been removed.

The c, m, y values of the calorimetric END signals 52 can be determined by finding ratios of the values of R, G, B calculated according to the equation (25) to the values Rw, Gw, Bw of R, G, B which are calculated by substituting the coordinates of the basic stimulus (white stimulus) Wxyz in the equation (25), and logarithmically converting the ratios according to the following equations (26) through (28):

$$c = -\log(R/Rw) \quad (26)$$

$$m = -\log(G/Gw) \quad (27)$$

$$y = -\log(B/Bw) \quad (28)$$

The rough data generator 54 effects a rough scanning process in order to shorten the setup process by selecting data from only an image area of the subject that has been specified by the operator through the CPU or generating decimated data from an image that is present on the entire area of the subject, rather than processing colorimetric END signals 52 of the entire subject.

Then, the automatic setup unit 58 carries out an automatic setup process based on colorimetric END signals 56 which are the rough data selected by the rough data generator 54 in a step S12. In the automatic setup process, the automatic setup unit 58 generates a histogram with respect to the colorimetric END signals 56 and thereafter generates a cumulative histogram, as is known from Japanese laid-open patent publication No. 2-105676.

As indicated by a characteristic diagram representative of operation of the END/END converter 64 in FIG. 1, a value of the colorimetric END signals 56 which corresponds to 0.1% point data (HL density) D1 is set to DH, and a value of the calorimetric END signals 56 which corresponds to 98% point data (SD density) D2 is set to DS, in the step S12.

If the density of D1 is D1=1.0 and the density of D2 is D2=2.0, for example, DH corresponding to the density of D1 is set to DH=0.1 and DS corresponding to the density of D2 is set to DS=3.0. Actually, point data (HL density) D1 of 0.1% is converted into a density corresponding to 0% in terms of halftone dot %, and point data (SD density) D2 of 98% is converted into a density corresponding to 100% in terms of halftone dot %.

Using the equation of a straight line 74 thus established in the characteristic diagram, the END/END converter 64 converts all the colorimetric END signals 52 of main scanned data (data toward which the rough scanning process is directed) into colorimetric END signals 66, i.e., converts gradation characteristics or corrects the gradation of the colorimetric END signals 52. The conversion equation used by the END/END converter 64 may be the equation of a curve that passes through a highlight point 75 (D1, DH) and a shadow point 76 (D2, DS). In the automatic setup process, the values of HL density D1 and SD density D2 (or the setup points 75, 76) are automatically determined under the predetermined conditions described above. However, the values of HL density D1 and SD density D2 may be determined manually, or the values of DH, DS may be corrected manually after the automatic setup process, in a manual setup process.

Then, the calorimetric END forward/inverse conversion matrix inversely converts the c, m, y values of the calorimetric END signals 66 converted by the END/END converter 64 back into X, Y, Z values of calorimetric signals 22 in a step S14. Specifically, the conversion process in the step S14 comprises a conversion process for converting the c, m, y values of the calorimetric END signals 66 into R, G, B values in an RGB calorimetric system in a step S14a, and a conversion process for converting the R, G, B values in the RGB calorimetric system into calorimetric signals 22 which have X, Y, Z values in an XYZ colorimetric system in a step S14b. The conversion process for converting the c, m, y values of the calorimetric END signals 66 into R, G, B values in an RGB calorimetric system is carried out according to the following equations (29)–(31) which solve the equations (26)–(28) for R, G, B, and the conversion process for converting the R, G, B values in the RGB calorimetric system into X, Y, Z values in an XYZ colorimetric system is carried out according to the following equation (32) which solves the equation (25) for a matrix XYZ:

$$R = R_w 10^{-c} \quad (29)$$

$$G = G_w 10^{-m} \quad (30)$$

$$B = B_w 10^{-y} \quad (31)$$

$$\begin{pmatrix} X \\ Y \\ Z \end{pmatrix} = \begin{pmatrix} R_X & R_Y & R_Z \\ G_X & G_Y & G_Z \\ B_X & B_Y & B_Z \end{pmatrix}^{-1} \begin{pmatrix} R \\ G \\ B \end{pmatrix} \quad (32)$$

The above setup process has been described with respect to colorimetric signals 22 from a reversal subject. However, the setup process may be applied to colorimetric signals 18 from a digital camera.

Specifically, reversal subjects are generally used as original subjects in the art of printing and platemaking. A reversal subject is exposed to an original scene, and a print is produced on the basis of colors in a color reproduction range 71 on the reversal subject. This means that the color reproduction range 71 in which colors are produced on the reversal subject is sufficient as a color reproduction range for image signals that are handled.

As described above, the colorimetric setup unit 26 linearly converts colorimetric values X, Y, Z into R, G, B values in a three-primary colorimetric system, logarithmically converts the ratios of the R, G, B values to basic stimuli (light source) $R_W$, $G_W$, $B_W$ thereby to determine END values, and effects the automatic setup process using the END values. Then, the colorimetric setup unit 26 converts the END values into other END values, inversely logarithmically converts the END values into modified R, G, B values, and converts the R, G, B values into colorimetric values X, Y, Z. Therefore, the automatic setup process can be carried out on the basis of existing density signals. The setup process may also be effected as the manual setup process.

The dye density converter 30 will be described below with reference to FIGS. 1, 5, and 6.

The dye density converter 30 converts the calorimetric signals (X, Y, Z) 18 of an original scene which are captured by a digital camera into dye density signals (c, m, y) 28 on a reversal subject.

Figure 5:
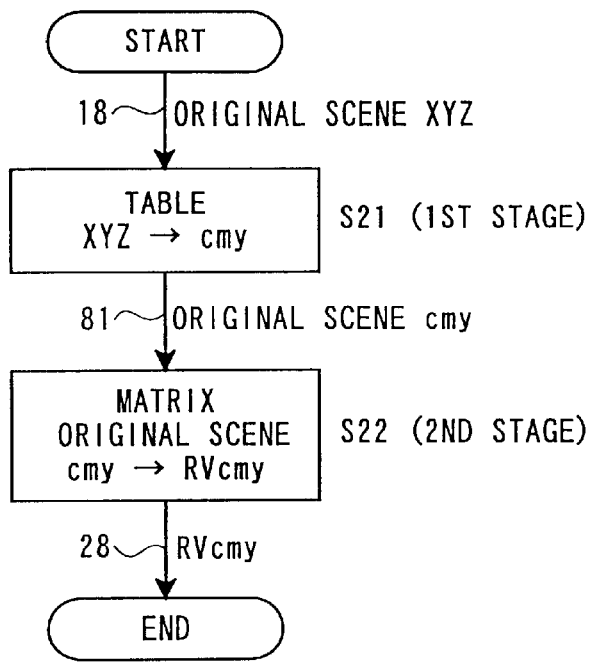
FIG. 5 is a flowchart of a conversion process for converting a colorimetric signal of a digital camera into a dye density signal on a reversal subject.
Figure 6:
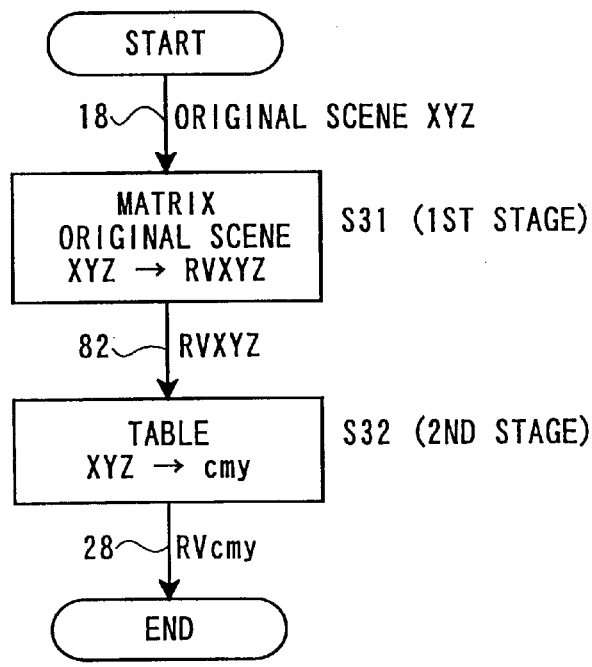
FIG. 6 is a flowchart of another conversion process for converting a calorimetric signal of a digital camera into a dye density signal on a reversal subject.

The conversion process carried out by the dye density converter 30 may be a process shown in FIG. 5 or a process shown in FIG. 6.

According to the process shown in FIG. 5, the colorimetric signals (X, Y, Z) 18 of an original scene are converted into dye density signals (c, m, y) 81 of the original scene by a lookup table in a step S21 (first stage), and the dye density signals (c, m, y) 81 of the original scene are converted into dye density signals (c, m, y) 28 on a reversal subject (hereafter also referred to as an RV) by a matrix (described later on) in a step S22 (second stage). According to the process shown in FIG. 6, the calorimetric signals (X, Y, Z) 18 of an original scene are converted into dye density signals (c, m, y) 82 on a reversal subject by a matrix (described later on) in a step S31 (first stage), and the dye density signals (c, m, y) 82 on the reversal subject are converted into dye density signals (c, m, y) 28 on the reversal subject by a lookup table in a step S32 (second stage).

Figure 7:
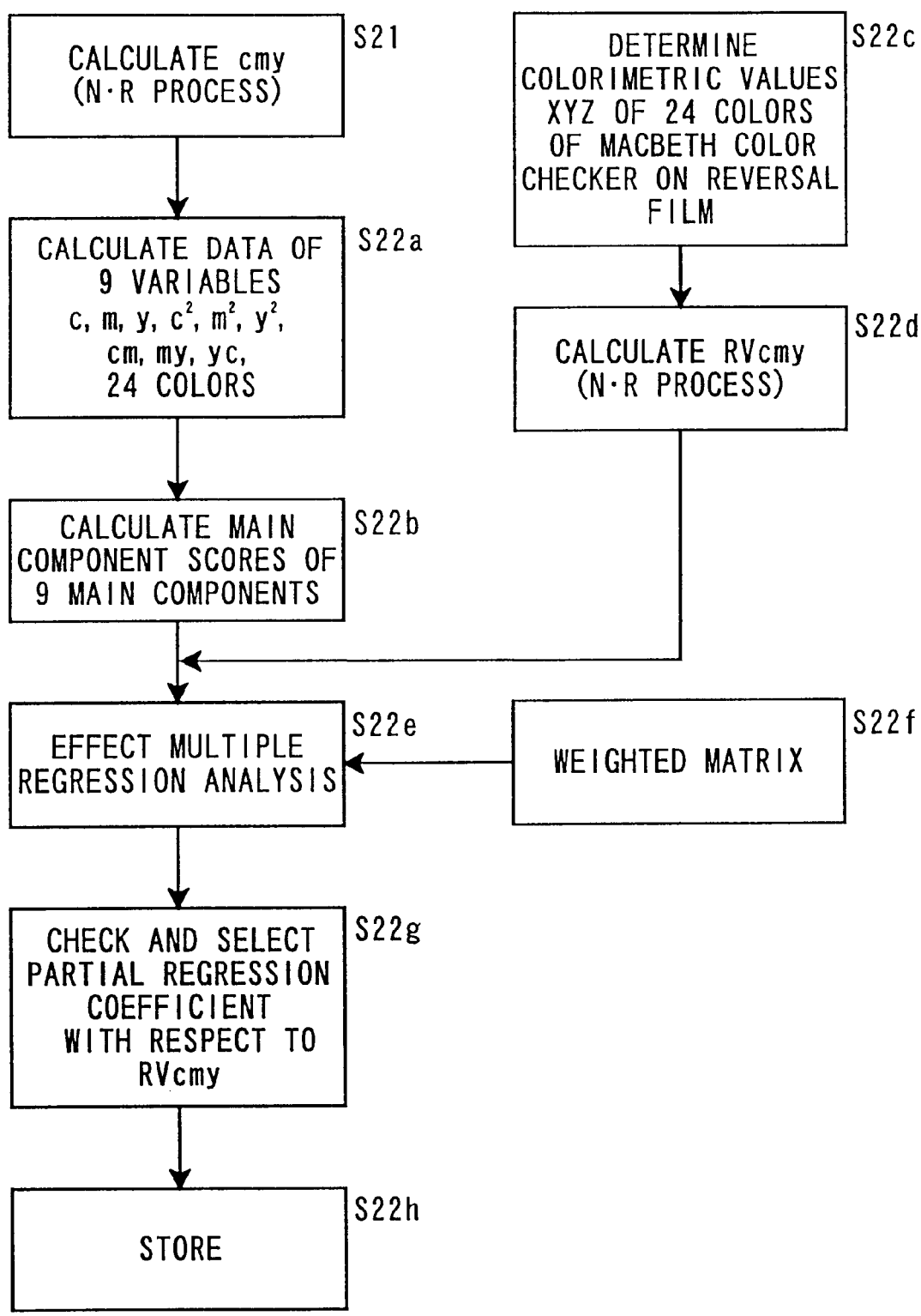
FIG. 7 is a flowchart of a sequence for generating a dye density conversion matrix.

The process shown in FIG. 5 will be described in detail with reference to FIG. 7.

Calculations in the step S21 for determining dye densities c, m, y from colorimetric values (tristimulus values) X, Y, Z will be described below.

The following equations (33)–(36) are satisfied between the colorimetric values X, Y, Z and the dye densities c, m, y:

$$X = k \int vis P(\lambda) T(\lambda) x(\lambda) d\lambda \quad (33)$$

$$Y = k \int vis P(\lambda) T(\lambda) y(\lambda) d\lambda \quad (34)$$

$$Z = k \int vis P(\lambda) T(\lambda) z(\lambda) d\lambda \quad (35)$$

$$T(\lambda) = 10^{-h} \quad (36)$$

where h = {cDc(λ)+mDm(λ)+yDy(λ)+base(λ)} k = 100/∫visP(λ)y(λ)dλ  (λ represents the wavelength of light)

∫vis: definite integral in the visible wavelength range (380 nm–780 nm)

P(λ): spectral data of the observing light source

T(λ): spectral transmittance data of the dye of a transmissive object x(λ), y(λ), z(λ): color matching function Dc(λ), Dm(λ), Dy(λ): spectral density data of c, m, y dyes base(λ): spectral density data of a film base To determine the dye densities c, m, y from the equations (33)–(36), inverse functions may be determined. However, such inverse functions cannot directly be determined. One solution is to use a successive approximating process such as the known Newton-Raphson method (see, for example, "Color Engineering" written by Noboru Ohta, pp. 254–260, published by Tokyo Denki University, publishing office, Dec. 20, 1993, 1st edition, 1st print) The Newton-Raphson method will briefly be described with reference to the above book.

Figure 8:
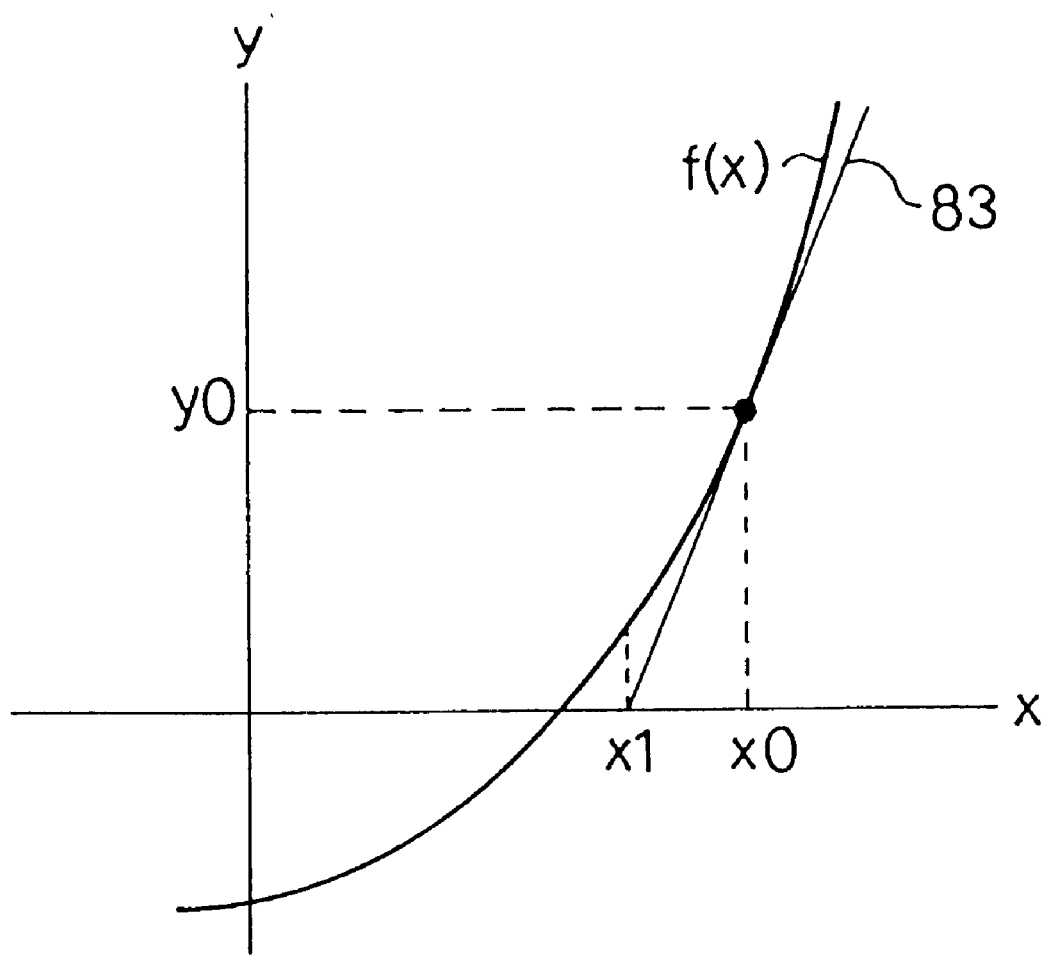
FIG. 8 is a diagram illustrative of the Newton-Raphson method.

When a general equation y=f(x) is expanded into a Taylor's series with x=x0 close to the root of f(x)=0, and only a term of first order is taken, f(x0+Δx)=f(x0)+f'(x0)·Δx is satisfied with respect to a minute change Δx of x. f'(x0) is produced by substituting x=x0 in a differential coefficient f'(x) of f(x). Therefore, a more correct value x1 of f(x)=0 is determined, assuming f(x0+Δx)=0, from x1=x0+Δx=x0−f(x0)/f'(x0). As shown in FIG. 8, this is equivalent to drawing a tangential line 83 to a point (x0, y0) on a function y=f(x) and determining a point x1 of intersection between the tangential line 83 and the x-axis.

Substituting the equation (36) in the equations (33)–(35) and using certain functions fx, fy, fz, the equations (33)–(35) can be expressed as the following equations (37)–(39):

$$X = fx(c, m, y) \quad (37)$$

$$Y = fy(c, m, y) \quad (38)$$

$$Z = fz(c, m, y) \quad (39)$$

It is assumed in the equations (37)–(39) that initial values are represented by c0, m0, y0 and tristimulus values by X0, Y0, Z0 at those initial values. If the tristimulus values X0, Y0, Z0 change respectively by ΔX0, ΔY0, ΔZ0 when the initial values c0, m0, y0 are subjected to minute changes Δc0, Δm0, Δy0, then the following equation (40) is obtained:

$$\begin{aligned} X0 + \Delta X &= fx(c0 + \Delta c, m0 + \Delta m, y0 + \Delta y) \\ &= fx(c0, m0, y0) + \Delta c \cdot \partial fx / \partial c + \\ &\quad \Delta m \cdot \partial fx / \partial m + \Delta y \cdot \partial fx / \partial y \\ &= X0 + \Delta c \cdot \partial X / \partial c + \Delta m \cdot \partial X / \partial m + \Delta y \cdot \partial X / \partial y \end{aligned} \quad (40)$$

where ∂fx/∂c, for example, represents a partial differential coefficient of the function fx with respect to c. The equation (40) is modified into an equation (41) given below.

Similarly, $\Delta Y$, $\Delta Z$ are also represented by respective equations (42), (43) as follows:

$$\Delta X = \Delta c \cdot \partial X/\partial c + \Delta m \cdot \partial X/\partial m + \Delta y \cdot \partial X/\partial y \quad (41)$$

$$\Delta Y = \Delta c \cdot \partial Y/\partial c + \Delta m \cdot \partial Y/\partial m + \Delta y \cdot \partial Y/\partial y \quad (42)$$

$$\Delta Z = \Delta c \cdot \partial Z/\partial c + \Delta m \cdot \partial Z/\partial m + \Delta y \cdot \partial Z/\partial y \quad (43)$$

The equations (41)–(43) can be presented in a matrix representation according to the following equation (44):

$$(Q) = (J)(P) \quad (44)$$

where (Q) represents a three-row, one-column matrix of elements which are $\Delta X$, $\Delta Y$, $\Delta Z$ arranged successively from the first row, (J) a Jacobian matrix of partial differential coefficients arranged in three rows and three columns, and (P) a three-row, one-column matrix of elements which are $\Delta c$, $\Delta m$, $\Delta y$ arranged successively from the first row.

When both sides of the equation (44) are multiplied by an inverse matrix $(J)^{-1}$ of the Jacobian matrix (J), the following equation (45) is obtained:

$$(P) = (J)^{-1}(Q) \quad (45)$$

Therefore, if the initial values c0, m0, y0 are corrected respectively into c1, m1, y1 as indicated by the following equations (46), then more correct approximate values can be produced:

$$c1 = c0 + \Delta c$$

$$m1 = m0 + \Delta m$$

$$y1 = y0 + \Delta y \quad (46)$$

By repeating calculations using the Jacobian matrix (J) thus obtained, it is possible to determine dye density signals c, m, y with respect to colorimetric values X, Y, Z which are arbitrary target values. The same process is effected on all target values on a grid in the XYZ color space to generate an inverse conversion table for converting the calorimetric signals (X, Y, Z) 18 of the original scene into dye density signals (c, m, y) 81 of the original scene, and the inverse conversion table is stored as a lookup table for the first-stage processing in the dye density converter 30 in the step S21.

A process of generating a matrix for use in the second stage which follows the first stage in the step S21 will be described below. The process of generating a matrix for use in the second stage includes the multiple regression analysis described above with reference to FIG. 2, and hence will briefly be described below.

With respect to the dye densities c, m, y calculated in the step S21, data of 24 colors of nine variables c, m, y, $c^2$, $m^2$, $y^2$, cm, my, yc are calculated in a step S22a.

Then, the 24-color data of the nine variables produced in the step S22a are subjected to a principal component analysis to produce principal component scores of the nine principal components in a step S22b.

Colorimetric values X, Y, Z of 24 colors of a Macbeth color checker on a reversal film are measured by a colorimetric meter in a step S22c.

Dye densities c, m, y (also referred to as RVc, RVm, RVy) on the reversal film are determined by the Newton-Raphson method in a step S22d.

With each of the dye densities RVc, RVm, RVy being used as a criterion variable and also with the principal component scores (including constant terms) determined in the step S22b being used as explanatory variables, a 3×10 matrix of partial regression coefficients is determined by a multiple regression analysis in a step S22e.

The multiple regression analysis may be subjected to a weighted matrix that is held in 1:1 correspondence to the 24 colors which constitute a group of criterion variables in a step S22f.

Then, the partial regression coefficients determined with respect to the criterion variables RVc, RVm, RVy are tested with a significance level of 5% in a step S22g, and explanatory variables at the significance level of 5% are stored in the RAM, and the partial regression coefficients are stored as the matrix for use in the second-stage processing in the dye density converter 30 in a step S22h. The partial regression coefficients may not be tested, but all of them may be used.

In this manner, the dye density converter 30 for converting calorimetric signals 18 of an original scene into dye density signals c, m, y on a reversal subject is constructed.

The process shown in FIG. 6 will be described with reference to FIG. 9. The sequence shown in FIG. 9 includes the multiple regression analysis described above with reference to FIG. 2, and hence will briefly be described below.

Figure 9:
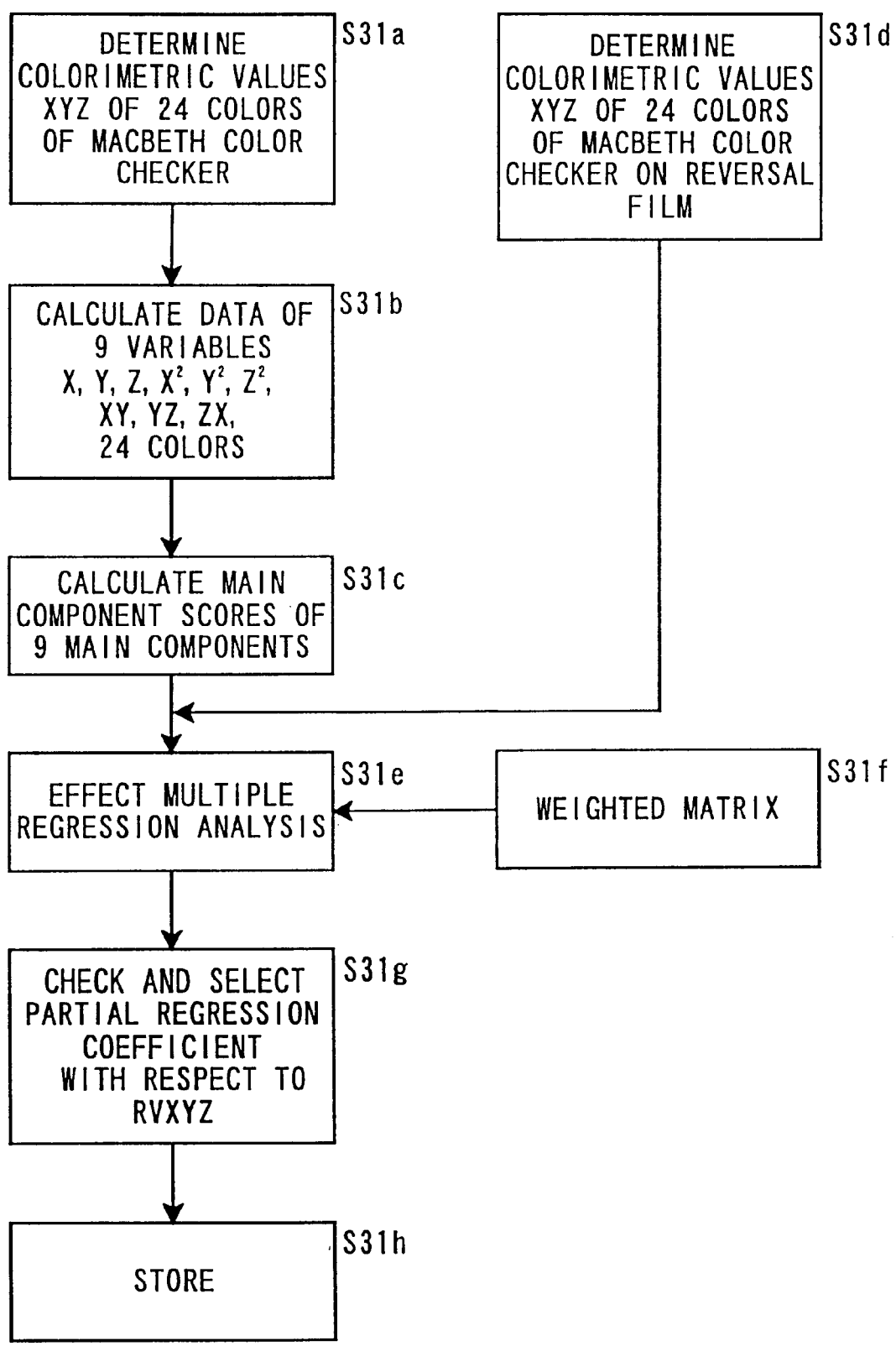
FIG. 9 is a flowchart of a portion of the sequence for generating a dye density conversion matrix.

Colorimetric values X, Y, Z of the 24 colors of the Macbeth color checker 70 are measured by a calorimetric meter in a step S31a (FIG. 9).

With respect to the measured calorimetric data X, Y, Z, data of 24 colors of nine variables X, Y, Z, $X^2$, $Y^2$, $Z^2$, XY, YZ, ZX are calculated in a step S31b.

Then, the 24-color data of the nine variables are subjected to a principal component analysis to produce principal component scores of the nine principal components in a step S31c.

Colorimetric values X, Y, Z of 24 colors of a Macbeth color checker on a reversal film are measured by a calorimetric meter in a step S31d. The Macbeth color checker on the reversal film is produced by photographing the image of a Macbeth color checker under a certain light source with an optical camera loaded with a reversal film, and then developing the photographed image on the reversal film.

With the calorimetric values X, Y, Z being used as criterion variables (RVX, RVY, RVZ) and also with the principal component scores (including constant terms) determined in the step S31c being used as explanatory variables, a 3×10 matrix of partial regression coefficients is determined by a multiple regression analysis in a step S31e.

The multiple regression analysis may be subjected to a weighted matrix that is held in 1:1 correspondence to the 24 colors which constitute a group of criterion variables in a step S31f.

Then, the partial regression coefficients determined with respect to the criterion variables RVX, RVY, RVZ are tested with a significance level of 5% in a step S31g, and explanatory variables at the significance level of 5% are stored in the RAM, and the partial regression coefficients are stored as the matrix for use in the first-stage processing in the dye density converter 30 in a step S31h. The partial regression coefficients may not be tested, but all of them may be used.

The table for use in the second stage in the step S32 is generated according to a process which is the same as the process in the step S21 or the step S22d described with reference to FIG. 7, and hence the process of generating the table for use in the second stage in the step S32 will not be described below.

Figure 10:
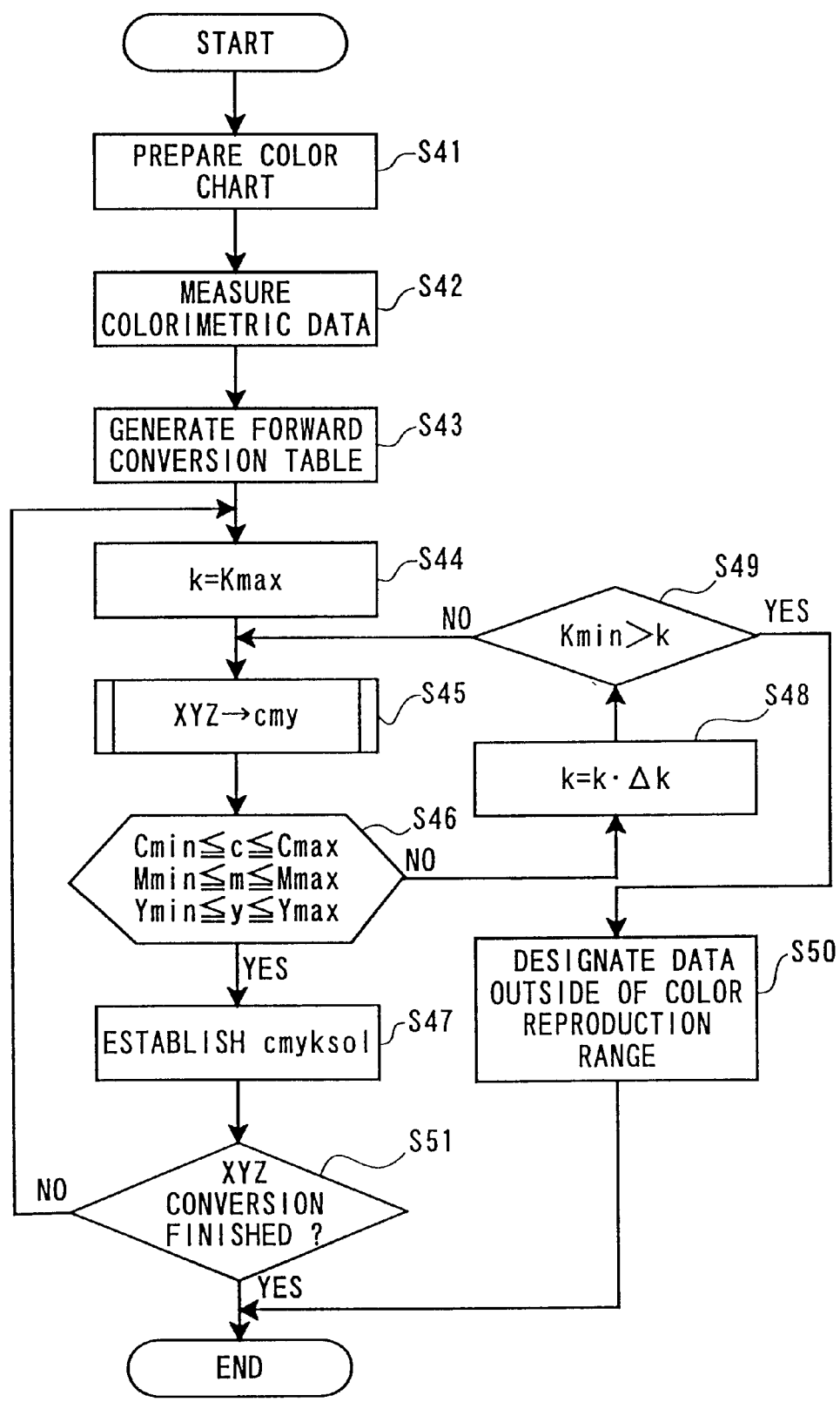
FIG. 10 is a flowchart of a sequence for generating an accurate original scene reproduction table.

A process of generating the accurate original scene reproduction table 42 of the cmyk converter 32 will be described below with reference to FIG. 10.

The accurate original scene reproduction table 42 is a lookup table for converting the calorimetric signals (X, Y, Z)

18 into c, m, y, k signals (c, m, y, k data) 46 which are calorimetrically saved halftone dot % data.

The process of generating the accurate original scene reproduction table 42 is the same as a process described in Japanese patent application No. 8-154584 filed by the same applicant as the present application.

A plurality of c, m, y, k halftone dot % data spaced at regular intervals are supplied to the image output unit 35 to generate a cmyk color chart having color patches whose c, m, y, k densities and mixed ratios vary stepwise in a step S41.

The regular intervals may be six intervals comprising increments of 20%, representing 0, 20, . . . , 100% in terms of halftone dot % for each of the colors c, m, y, k. In such a case, the total number of color patches is $4^6=1296$.

Then, the color patches of the cmyk color chart generated by the image output unit 35 are calorimetrically measured by a calorimetric meter in a step S42. Colorimetric values (stimulus values) X, Y, Z are determined from the measured calorimetric data, and a conversion table (called a forward conversion table) for converting the c, m, y, k halftone dot % data into calorimetric value data X, Y, Z is generated in a step S43.

The forward conversion table is used as an interpolating table. Therefore, the smaller the regular intervals described above, the better for interpolation accuracy. However, since smaller regular intervals result in a larger expenditure of time and labor required for calorimetrically measuring the color patches, a trade-off should be made between the complexity of the colorimetric measurement and the interpolation accuracy, and a computer processing time described below.

For determining c, m, y, k signals (c, m, y, k halftone dot % data, color data c, m, y, k, or c, m, y, k) from inputted arbitrary calorimetric value signals (colorimetric value data X, Y, Z, stimulus value data X, Y, Z, or X, Y, Z) according to the accurate original scene reproduction table 42, since variables increase from three variables to four variables, a plurality of solutions of c, m, y, k halftone dot % data 46 may exist with respect to one set of colorimetric value data X, Y, Z. In order to eliminate this drawback, it is necessary to establish a relationship between three variables and three variables for the accurate original scene reproduction table 42. To meet this requirement, the color data k of the c, m, y, k halftone dot % data is fixed to a maximum value Kmax (k=Kmax) that can be employed by the image output unit 35 in a step S44. The maximum value Kmax is the same as 100%, for example, for the value of k of the c, m, y, k halftone dot % data.

Then, arbitrary values X, Y, Z which are three variables are converted into corresponding values c, m, y (with k being fixed) which are three variables in a step S45.

For determining c0, m0, y0, k0=Kmax which are values c, m, y, k (since k is fixed to k=Kmax, k is a constant, and therefore c, m, y are three variables) with respect to target values X0, Y0, Z0 that are arbitrary values X, Y, Z, the forward conversion table with k0=Kmax is used to determine partial regression coefficients of a regression equation.

If it is assumed that a matrix of coefficient terms in three rows and four columns is represented by A, a matrix of calorimetric values X, Y, Z in three rows and one column by T, and a matrix of c, m, y, k (k is fixed or a constant) in four rows and one column by D, then the regression equation is expressed by:

$$T = AD \qquad (47)$$

The equation (47) represents the following equation (48):

$$\begin{pmatrix} X \\ Y \\ Z \end{pmatrix} = \begin{pmatrix} A_{X1} & A_{X2} & A_{X3} & A_{X4} \\ A_{Y1} & A_{Y2} & A_{Y3} & A_{Y4} \\ A_{Z1} & A_{Z2} & A_{Z3} & A_{Z4} \end{pmatrix} \begin{pmatrix} c \\ m \\ y \\ 1 \end{pmatrix} \qquad (48)$$

In the equations (47), (48), "1" of the matrix D is a value established to give a constant term in a three-dimensional plane equation of c, m, y.

The coefficients in the equation (48) can be determined according to the above multiple regression analysis by substituting the data sets of the above forward conversion table which are obtained when k=Kmax.

Then, using the regression equation determined when k=Kmax, c, m, y (with k being established as Kmax) values corresponding to the target values X0, Y0, Z0 can be determined according to the Newton-Raphson method.

Therefore, it is determined whether the determined c, m, y values are values (colors) within a reproduction range of the image output unit 35 in a step S46. Specifically, it is determined whether the determined values c, m, y satisfy the following ranges:

$$Cmin \leq c \leq Cmax \qquad (49)$$
$$Mmin \leq m \leq Mmax$$
$$Ymin \leq y \leq Ymax$$

where Cmin, Mmin, Ymin represent reproducible minimum densities of the halftone dot % data (color data) and Cmax, Mmax, Ymax reproducible maximum densities thereof.

If the determined values c, m, y satisfy the ranges (49), then an inverse conversion table is generated by setting the color data c, m, y, k with respect to the target values (X0, Y0, Z0) for the stimulus value data X, Y, Z respectively to c=csol, m=msol, y=ysol, k=ksol (ksol=Kmax), and established as the accurate original scene reproduction table 42 in a step S47. The data set (csol, msol, ysol, ksol) will also be referred to as color data cmyksol.

If the determined values c, m, y do not satisfy the ranges (49), then the color data k which has been fixed to k=Kmax is set to k=k−Δk, i.e., k=kmax−Δk, in a step S48, and the step S45 is repeated insofar as the color data k is greater than a given minimum value k=Kmin in a step S49. The minute change Δk constitutes an arbitrary data interval of the color data k of the inverse conversion table. For example, if the color data k is established as data in a range from 0% to 100%, then the minute change Δk may be set to 1%, and if the color data k is established as data in a range from 0 to 255,then the minute change Δk may be set to 1. In the second execution of the step S45, the values X, Y, Z which are colorimetric vales on the left-hand side of the equation (48) with respect to the color data k=Kmax=1=100−1=99 can be determined by interpolating the X, Y, Z data calorimetrically measured at the values k=Kmax=100% and k=80% and stored in the forward conversion table.

If Kmin>k in the step S49, then the color data c, m, y, k with respect to the target values (X0, Y0, Z0) are indicated as data outside of the color reproduction range of the image output unit 35, and no color data cmyksol is calculated in a step S50.

The above process is carried out while all the stimulus value data X, Y, Z 18 supplied to the accurate original scene reproduction table 42 are being used as target values (X0, Y0, Z0), for thereby determining color data cmyksol when maximum color data k is given to the stimulus value data X, Y, Z 18 capable of producing halftone dot % data c, m, y, k 46 within the color reproduction range of the image output unit 35, in a step S51.

In the step S44, the color data k may be fixed to the minimum value Kmin (k=Kmin), rather than the maximum value Kmax. In such a case, the color data k is set to k=k+Δk in the step S48, and it is determined in the step S49 whether the color data k is greater than the maximum value Kmax (Kmax<k). The color data k may alternatively be set to an arbitrary value. If the color data k is set to an arbitrary value, then the color data k may set alternately to k=k−Δk and k=k+Δk, and the step S49 may be carried out in a manner depending on the step S48.

The color data c, m, y, k indicated as data outside of the color reproduction range of the image output unit 35 in the steps S49, S50 will not be described in detail because they have no direct bearing on the features of the present invention. However, as described in Japanese patent application No. 8-154584, it is possible to generate an inverse conversion table of color data c, m, y, k with respect to the target values (X0, Y0, Z0) based on the compression or clipping of color data C, M, Y, K according to gamut mapping.

The association table of the c, m, y, k signals 46 determined with respect to all the target values (X0, Y0, Z0) of the colorimetric signals 18 is stored as the accurate original scene reproduction table 42 for thereby converting arbitrary colorimetric signals 18 into c, m, y, k signals 46 within the color reproduction range of the image output unit 35.

A process of generating the standard condition reproduction table 44 of the cmyk converter 32 will be described below.

Figure 11:
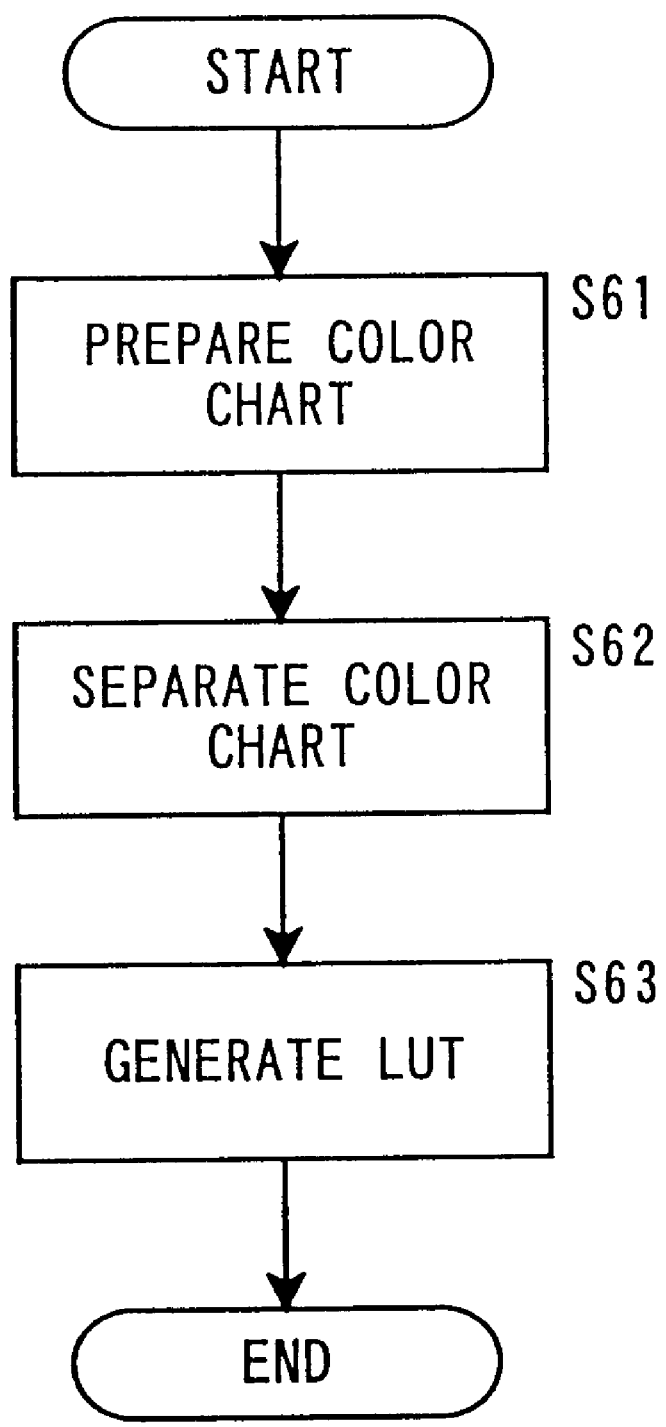
FIG. 11 is a flowchart of a sequence for generating a standard condition reproduction table.

The process of generating the standard condition reproduction table 44 will be described below with reference to FIG. 11.

First, a color chart having 13×13×13 color patches having different dye densities c, m, y that are arranged in a grid-like pattern on a reversal subject are generated in a step S61. Specifically, the color chart has color patches representing a combination of colors c, m, y, each having 13 densities ranging from a minimum density to a maximum density.

Then, the color chart is color-separated under color-separating default conditions of a color scanner. Stated otherwise, the color chart, which is a transmissive subject, is read by the color scanner so as to be converted into digital data in a step S62. The color-separating default conditions include at least a gradation conversion process, a color correction process, an under color removal process, and a K-plate generating process. For color separation, the minimum density of gray of the color patches is established such that the corresponding data of c, m, y, k halftone dot % are all 0%, and the maximum density of gray of the color patches is established such that the corresponding data of c, m, y, k halftone dot % represent a solid image.

Then, the dye densities of the color patches and the values of c, m, y, k halftone dot % which are color-separated under the color-separating default conditions of the color scanner are associated with each other, thus generating a conversion table (lookup table) as the standard condition reproduction table 44 in a step S63. Actually, arbitrary dye density signals (c, m, y) 28 or dye density signals (c, m, y) 34 ranging from the minimum density to the maximum density can be converted into desired c, m, y, k halftone dot % signal 48 by the standard condition reproduction table 44 and an interpolation process.

As described above, according to the embodiment of the present invention, for converting arbitrary color signals 12 in a first color space, e.g., R, G, B signals 12 captured by a digital camera, into color signals in a second color space, e.g., calorimetric signals (X, Y, Z or L*, a*, b*) 18, a color chart having a plurality of color patches representing typical colors with different chromas, lightnesses, and hues, i.e., a commercially available Macbeth color checker, is imaged by the digital camera which is to output the color signals 12 in the first color space. At least first-order, second-order, and cross terms of R, G, B signals of the imaged color chart are calculated as a group of first explanatory variables. The group of first explanatory variables is then subjected to a principal component analysis for conversion into a group of second explanatory variables which cross each other. Colorimetric values of the color patches of the color chart (color signals in the second color space) are used as a group of criterion variables, and the group of criterion variables and the group of second explanatory variables are subjected to a multiple regression analysis to determine a matrix of partial regression coefficients. Finally, the partial regression coefficients are tested to select explanatory variables at a predetermined significance level among the group of second explanatory variables, and the selected explanatory variables are established as usable explanatory variables.

The R, G, B signals are then subjected to a matrix of partial regression coefficients relative to the usable explanatory variables for conversion into the calorimetric signals (X, Y, Z) 18.

Since the above process of converting color signals use matrices which have a small amount of data, the storage capacity for storing the matrices may be relatively small. Because the group of second explanatory variables converted by the principal component analysis is used, the accuracy of color conversion is much better than the conventional matrix process. If the weighting of desired colors corresponding to certain scene types such as the color of human skin, the color of sky (blue), and the color of vegetables green), among the colorimetric values of the group of criterion variables is increased, then those desired colors can be converted with greater accuracy. The desired colors may be a most frequent color or an average color that is determined by statistically processing R, G, B signals of one frame supplied from the digital camera, so that the colors of that frame can be converted with highest accuracy. If a Macbeth color checker having color patches which represent 24 colors substantially uniformly covering a color space is used as the color chart, then a conversion matrix for converting the colors of R, G, B signals accurately into colorimetric values can easily be generated.

Because the embodiment employs an improved matrix process, colors can be converted with high accuracy using a relatively small memory capacity.

Desired colors that have been selected can be converted with higher accuracy.

If necessary, an existing color chart may be used. For example, if a Macbeth color checker (registered trademark) is used as the color chart, then it is possible to generate, with color patches of 24 colors, a matrix capable of converting colors highly accurately with respect to an overall color space.

According to the embodiment of the present invention, as described above, R, G, B signals 12 which are device-dependent image signals of an original scene captured by a digital camera and/or R, G, B signals 14 which are device-dependent image signals of a reversal film subject read by a scanner are converted into colorimetric signals (X, Y, Z) 18, 22 which are device-independent image signals by the calorimetric converter 16. The calorimetric signals (X, Y, Z)

18, 22 are forwardly converted into colorimetric END signals 52 by the colorimetric END forward/inverse conversion matrix 50.

In the forward conversion process, chromaticity coordinates Rxyz, Gxyz, Bxyz of three reference color stimuli R, G, B on a chromaticity diagram are established in a range 73 (see FIG. 4) which contains a color reproduction range 71.

In order to effect automatic setup calculations in a short period of time, the rough data generator 54 generate only decimated signals from the calorimetric END signals 52.

The automatic setup unit 58 effects an existing automatic setup process on the colorimetric END signals 52 for which gray conditions have been prescribed. For example, the automatic setup unit 58 generates a histogram with respect to the colorimetric END signals 52 and thereafter generates a cumulative histogram. Certain values of the histogram, e.g., a value of 0.1% is set to highlight point density (highlight setup point) D1 and a value of 98% is set to a shadow point density (shadow setup point) D2.

The highlight setup point D1 and the shadow setup point D2 are associated respectively with colorimetric END values corresponding to highlight halftone dot % and shadow halftone dot %, e.g., DH of 0.1 and DS of 2.0 by a gradation conversion curve 74. Based on the gradation conversion curve 74, the calorimetric END signals 52 are converted into calorimetric END signals 66 by the END/END converter 64.

Based on the gradation conversion curve 74 which has been established by the automatic setup process, the gradation-converted colorimetric END signals 66 are inversely converted into the colorimetric signals 18 by the calorimetric END forward/inverse conversion matrix 50.

As a result, the automatic setup process based on existing density signals of the scanner can be effected on the R, G, B signals 12 from the digital camera. The highlight point density (highlight setup point) D1 and the shadow point density (shadow setup point) D2 may be set to arbitrary desired values, or stated otherwise, may be determined manually, so that a conventional setup process in terms of densities can be carried out.

Since colorimetric signals are converted into colorimetric END signals, it is possible to effect the setup process thereon in terms of densities.

Because when colorimetric signals are converted into colorimetric END signals, they are converted within the reproduction range of the reversal film, it is possible to employ an existing automatic (or manual) setup process of a linear scanning reader, e.g., a scanner, for image signals from the reversal subject.

According to the above embodiment, furthermore, for converting device-dependent image signals of an original scene, e.g., R, G, B signals 12 captured by a digital camera, into calorimetric signals (X, Y, Z or L*, a*, b*) 18, a color chart having a plurality of color patches representing desired typical colors with different chromas, lightnesses, and hues, i.e., a commercially available Macbeth color checker, is imaged by the digital camera which is to output the device-depending image signals. At least first-order terms of R, G, B signals of the imaged color chart are calculated as a group of first explanatory variables. The group of first explanatory variables is then subjected to a principal component analysis for conversion into a group of second explanatory variables which cross each other. Colorimetric values of the color patches of the color chart (color signals in the second color space) are used as a group of criterion variables, and the group of criterion variables and the group of second explanatory variables are subjected to a multiple regression analysis to determine a matrix of partial regression coefficients. Finally, the partial regression coefficients are tested to select explanatory variables at a predetermined significance level among the group of second explanatory variables, and the selected explanatory variables are established as usable explanatory variables.

The R, G, B signals are then subjected to a matrix of partial regression coefficients relative to the usable explanatory variables for conversion into the colorimetric signals (X, Y, Z) 18.

Since the above process of converting the R, G, B signals 12 as device-dependent image signals into the calorimetric signals 18 as device-independent image signals use matrices which have a small amount of data, the storage capacity for storing the matrices may be relatively small. Because the group of second explanatory variables converted by the principal component analysis is used, the accuracy of color conversion is much better than the matrix process of the color conversion technique as disclosed in Japanese laid-open patent publication No. 2-29177 (According to this color conversion technique, R, G, B signals which are not subjected to a principal component analysis and their squared terms are used for color conversion with a matrix produced by a multiple regression analysis. Because explanatory variables are highly correlated to each other, a multicollineation phenomenon which is an unstable model may be caused statistically, and as a result a low accuracy of color conversion with respect to colors other than those colors which are used to generate the matrix is not compensated for).

If a Macbeth color checker having color patches which represent 24 colors substantially uniformly covering a color space is used as the color chart, then a conversion matrix for converting the colors of R, G, B signals accurately into calorimetric values can easily be generated.

The calorimetric signals 18 of the original scene which have been converted by the matrix 20 are converted into c, m, y, k signals whose colors are calorimetrically saved by the accurate original scene reproduction table 42 which is an association table of c, m, y, k signals 46 determined with respect to all target values of the colorimetric signals 18 of the original scene.

Therefore, hues, in particular, of an image on a hard copy that is produced by the image output unit 35 based on the c, m, y, k signals 46 which is produced depending on the R, G, B signals 12, are highly accurately representative of the hues of the original scene.

Before the calorimetric signals 18 of the original scene are converted into the c, m, y, k signals 46, the colorimetric signals 18 are converted into calorimetric END signals 52. After the calorimetric END signals 52 are subjected to a setup process and a gradation conversion process, they are inversely converted into colorimetric signals 18, which are then converted into c, m, y, k signals 46 whose colors are calorimetrically saved. Accordingly, it is possible to achieve a desired image-dependent finish based on accurately reproduced colors of the original scene.

If necessary, a process of changing the colorimetric signals 18 of the original scene into colorimetric signals 18 under an observing light source different from the imaging light source may be added to accomplish the same color reproduction as under the imaging light source.

According to the present invention, therefore, c, m, y, k signals having hues which are highly similar to those of the original scene can be produced from the device-dependent image signals that are generated from the original scene.

Since the device-dependent image signals are generated from a digital camera, for example, it is possible to obtain a hard copy accurately representative of the colors of the original scene more easily than the conventional process of generating a hard copy from a reversal film as a subject.

According to the above embodiment, moreover, R, G, B signals 12 of an original scene captured by a digital camera are converted into device-independent calorimetric signals 18, which are then converted into c, m, y signals 28 which are dye density signals on an exposed reversal film by the dye density converter 30.

The c, m, y signals 28 which are dye density signals on the exposed reversal film have been converted as signals that can be processed in the same manner as dye density signals (c, m, y signals) 34 on a reversal film that has been exposed to signals read by a scanner input unit. Therefore, the c, m, y signals 28 can easily be converted into c, m, y, k signals 48 which are halftone dot % signals under so-called color-separating default conditions (image processing conditions including a gradation conversion process, a color correction process, a sharpness controlling process, an under color removal process, and a K-plate generating process) which are stored as the standard condition reproduction table 44 in a memory.

Thus, the R, G, B signals 12 outputted from the digital camera can easily be converted into c, m, y, k signals 48 which are halftone dot % signals.

According to the present invention, device-dependent image signals of an original scene are converted into calorimetric signals, and the calorimetric signals are then converted into dye density signals on a reversal subject.

Consequently, device-dependent image signals of an original scene can easily be handled by a color-separating system of a scanner (under standard color-separating conditions).

More specifically, inasmuch as signals supplied to a signal processing system of a scanner are dye density signals on a reversal subject, even if the device-dependent image signals are generated by a digital camera or a scanner, it is possible to output a desired image from the supplied image signals, directly using so-called color-separating default conditions (image processing conditions including a gradation conversion process, a color correction process, an under color removal process, and a K-plate generating process) which are stored as standard conditions in a particular scanner that has been standardized empirically.

Since the color-separating default conditions can be used, the additional advantage of shortening a period of time required until the image is outputted is also provided.

According to the above embodiment, furthermore, R, G, B signals 12 of an original image captured by a digital camera are converted into calorimetric signals (X, Y, Z) 18 by the matrix 20 of the calorimetric converter 16, and the colorimetric signals (X, Y, Z) 18 are subjected, if necessary, to a setup process by the calorimetric setup unit 26 and converted into dye density signals (c, m, y) 28 on a reversal subject by the dye density converter 30.

R, G, B signals 14 obtained from a reversal subject by the scanner input unit are converted into colorimetric signals (X, Y, Z) 22 by the table 24 of the calorimetric converter 16, and the colorimetric signals (X, Y, Z) 22 are subjected, if necessary, to a setup process by the colorimetric setup unit 26 and converted into dye density signals (c, m, y) 34 by the dye density converter 36.

The dye density signals (c, m, y) 34 supplied through the dye density converter 36 to one port of the switch 45 of the cmyk converter 32 are dye density signals on a reversal subject, and the dye density signals (c, m, y) 28 supplied through the dye density converter 30 to the other port of the switch 45 are also dye density signals on a reversal subject.

The standard condition reproduction table 44 stores standard color-separating default conditions (image processing conditions including a gradation conversion process, a color correction process, an under color removal process, and a K-plate generating process) for color-separating the dye density signals on the reversal subject. The dye density signals 28, 34 on the reversal subject are color-separated and converted into c, m, y, k signals which are halftone dot % signals by the color-separating default conditions.

Therefore, the switch 45 can select one of its input ports depending on whether image signals are supplied from a digital camera (R, G, B signals 12) or a scanner input unit (R, G, B signals 14), and output signals from the switch 45 can easily be converted into c, m, y, k signals which are halftone dot % signals by the common standard color-separating default conditions.

According to the present invention, R, G, B signals outputted from a digital camera are converted into colorimetric signals, and then the colorimetric signals are converted into dye density signals. Furthermore, R, G, B signals outputted from an image reader are converted into calorimetric signals, and then the colorimetric signals are converted into dye density signals. The dye density signals are then processed under standard image processing conditions including a gradation conversion process, a color correction process, an under color removal process, and a K-plate generating process, for conversion into c, m, y, k signals which are halftone dot % signals.

Even if inputted R, G, B signals are supplied from a digital camera or an image reader, a desired image can be outputted on the basis of the R, G, B signals directly using so-called color-separating default conditions which are stored as standard conditions in a particular image reader, e.g., a scanner, that has been standardized empirically. Inasmuch as the R, G, B signals are converted into device-independent calorimetric signals, it is possible to output a device-independent image based on the R, G, B signals.

Although a certain preferred embodiment of the present invention has been shown and described in detail, it should be understood that various changes and modifications may be made therein without departing from the scope of the appended claims.

What is claimed is:

1. A method of processing an image signal, comprising:

converting device-dependent image signals produced from an original scene into a plurality of colorimetric signals and converting said colorimetric signals into colorimetric equivalent-neutral-density signals of said original scene;

generating rough data of said colorimetric equivalent-neutral-density signals;

setting up automatically a gradation conversion curve based on said rough data;

converting gradations of said colorimetric equivalent-neutral-density signals based on said gradation conversion curve; and converting the colorimetric equivalent-neutral-density signals whose gradations have been converted into a plurality of colorimetric signals;

wherein setting up the gradation conversion curve comprises determining a cumulative histogram of density values and assigning a high density point and a low density point based on the histogram values.

2. A method according to claim 1, wherein said step of converting colorimetric signals into colorimetric equivalent-neutral-density signals comprises converting the colorimetric signals into R, G, B signals in a RGB color system, and logarithmically converting ratios of said R, G, B signals to a basic stimulus into the colorimetric equivalent-neutral-density signals, and wherein said step of converting the colorimetric equivalent-neutral-density signals whose gradations have been converted into colorimetric signals comprises inversely logarithmically converting the colorimetric equivalent-neutral-density signals whose gradations have been converted into R, G, B signals, and converting the R, G, B signals into the colorimetric signals.

3. A method according to claim 2, wherein said RGB color system comprises a range including reference color stimuli and containing a color reproduction range of a reversal film.

4. The method of claim 3, wherein the plurality of colorimetric signals comprise a plurality of device-independent colorimetric signals.

5. The method of claim 1, wherein the high density point is associated with a colorimetric END value corresponding to a highlight halftone percentage, and the low density point is associated with a colorimetric END value corresponding to a shadow halftone dot percentage.

* * * * *